(12) United States Patent
Butcher et al.

(10) Patent No.: US 6,209,420 B1
(45) Date of Patent: Apr. 3, 2001

(54) METHOD OF MANUFACTURING BITS, BIT COMPONENTS AND OTHER ARTICLES OF MANUFACTURE

(75) Inventors: Trent N. Butcher, Sandy; Sidney L. Findley, West Valley City; Redd H. Smith, Salt Lake City, all of UT (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/135,522

(22) Filed: Aug. 17, 1998

Related U.S. Application Data

(63) Continuation-in-part of application No. 08/691,863, filed on Aug. 2, 1996, now Pat. No. 5,957,006, which is a continuation of application No. 08/438,200, filed on May 9, 1995, now Pat. No. 5,544,550, which is a division of application No. 08/213,866, filed on Mar. 16, 1994, now Pat. No. 5,433,280, and a continuation-in-part of application No. 08/719,254, filed on Sep. 24, 1996, now Pat. No. 6,073,518, and a continuation-in-part of application No. 08/719,281, filed on Sep. 24, 1996, now Pat. No. 5,839,329.

(51) Int. Cl.$^7$ .................................................... B21K 5/04
(52) U.S. Cl. .............................. 76/108.2; 419/5; 419/28
(58) Field of Search .............................. 76/108.2, 108.1; 419/5, 28; 264/125

(56) References Cited

U.S. PATENT DOCUMENTS

| | | |
|---|---|---|
| 3,471,921 | 10/1969 | Feenstra et al. . |
| 3,757,878 | 9/1973 | Wilder et al. . |
| 3,757,879 | 9/1973 | Wilder et al. . |
| 3,986,546 | 10/1976 | Green et al. . |
| 4,064,926 | 12/1977 | Naegele . |
| 4,398,952 | 8/1983 | Drake . |
| 4,414,028 | 11/1983 | Inoue . |
| 4,423,646 | 1/1984 | Bernhardt . |
| 4,484,644 | 11/1984 | Cook et al. . |
| 4,702,304 | 10/1987 | Rice . |
| 4,711,143 | * 12/1987 | Loukanis et al. ................... 76/108.2 |
| 4,863,538 | 9/1989 | Deckard . |
| 4,884,477 | 12/1989 | Smith et al. . |

(List continued on next page.)

FOREIGN PATENT DOCUMENTS

| | | |
|---|---|---|
| 33 47 501 A1 | 5/1985 | (DE) . |
| 0 096 591 | 12/1983 | (EP) . |
| 0 145 421 | 6/1995 | (EP) . |
| 1 572 543 | 7/1980 | (GB) . |
| 2 230 981 | 11/1990 | (GB) . |
| 2 287 959 | 10/1995 | (GB) . |
| 2 296 673 | 7/1996 | (GB) . |
| WO 9003893 | 4/1990 | (WO) . |
| WO 9208592 | 5/1992 | (WO) . |

OTHER PUBLICATIONS

Author unknown, "Models in Minutes—and At Your Desk", *Machine Design*, pp. 20 & 23, Oct. 22, 1993.

(List continued on next page.)

*Primary Examiner*—Douglas D. Watts
(74) *Attorney, Agent, or Firm*—Trask Britt

(57) ABSTRACT

A method of fabricating rotary-type drill bits, drilling-related structures, and other articles of manufacture. The method includes fabricating a machinable matrix, machining the matrix, and dispersing a binder material throughout the matrix. The matrix of the rotary-type drill bit may be fabricated by layered-manufacturing techniques or by disposing a particulate or powdered material into a mold and binding the particles together with a resin or by sintering. The matrix may have the desired dimensions and features, the approximate dimensions and features, or lack desired dimensions or features of a drilling-related structure or other article of manufacture. The matrix is machined to correct any anisotropies or imperfections of the matrix, to refine features of the matrix, or to define the features in the matrix. The machined matrix may be infiltrated with a binder material to define a drill bit body.

34 Claims, 16 Drawing Sheets

U.S. PATENT DOCUMENTS

| | | |
|---|---|---|
| 4,919,013 | 4/1990 | Smith et al. . |
| 5,000,273 | 3/1991 | Horton et al. . |
| 5,017,753 | 5/1991 | Deckard . |
| 5,090,491 | 2/1992 | Tibbitts et al. . |
| 5,101,692 | 4/1992 | Simpson . |
| 5,132,143 | 7/1992 | Deckard . |
| 5,155,321 | 10/1992 | Grube et al. . |
| 5,155,324 | 10/1992 | Deckard et al. . |
| 5,156,697 | 10/1992 | Bourell et al. . |
| 5,182,170 | 1/1993 | Marcus et al. . |
| 5,252,264 | 10/1993 | Forderhase et al. . |
| 5,284,695 | 2/1994 | Barlow et al. . |
| 5,304,329 | 4/1994 | Dickens, Jr. et al. . |
| 5,316,580 | 5/1994 | Deckard . |
| 5,332,051 | 7/1994 | Knowlton . |
| 5,342,919 | 8/1994 | Dickens, Jr. et al. . |
| 5,352,405 | 10/1994 | Beaman et al. . |
| 5,373,907 | 12/1994 | Weaver . |
| 5,385,780 | 1/1995 | Lee . |
| 5,433,280 | 7/1995 | Smith . |
| 5,441,121 | 8/1995 | Tibbitts . |
| 5,453,241 | 9/1995 | Akerman et al. . |
| 5,511,603 | 4/1996 | Brown et al. . |
| 5,544,550 | 8/1996 | Smith . |
| 5,618,484 | 4/1997 | Mogensen et al. . |
| 5,632,326 | 5/1997 | Gough . |
| 5,641,015 | 6/1997 | Challand . |
| 5,663,883 | 9/1997 | Thomas et al. . |

OTHER PUBLICATIONS

Author unknown, "Rapid Mold Maker Promise Faster Metal Prototypes", *Machine Design*, Nov. 26, 1992.

Author unknown, "Protech Engineer Applies Finishing Touch to Stereolithography", pp. 36 & 37, undated.

Dvorak, Paul, "Rapid Prototypes for Production Parts", *Machine Design*, pp. 48–54, Oct. 8, 1993.

Protech Services, Inc. company brochure, undated.

Tait, David, Autofact '93 Conference materials entitled "Cashing in on Rapid Prototyping", Nov. 10, 1993.

Wohlers, Terry, Autofact '93 Conference materials entitled Advancements in Rapid Prototyping, Nov. 10, 1993.

News Release—from Soligen, Inc., entitled Soligen Announces DSPC™ Machine Order by Ashland Chemical, Jul. 14, 1993.

News Release—from Soligen, Inc. entitled "Soligen Demonstrates Fast Production of Casting Molds is Feasible Multiple Jets Used to Greatly Increase Production Speed", Aug. 17, 1993.

News Release—from Soligen,Inc., entitled "Soligen Demonstrates Surface Finish Improvement for Casting Process", Nov. 8, 1993.

Soligen, Inc. brochure entitled "Technology Backgrounder", May. 1993.

Soligen, Inc. brochure entitled "If all metal parts were this simple, there would be no need for Direct Shell Production Castings", undated.

Ashley, Steven, "CGI Casting: A New Iron in the Fire", *Mechanical Engineering*, vol. 114/No. 11, pp. 49–51, Nov. 1992.

Uziel, Yehoram, An Unconventional Approach to Producing Investment Casting, *Modern Casting*, Aug. 1993.

Prioleau, Frost, et al., "The Virtual Vision Story", *Pro E The Magazine*, vol. 1, No. 2, pp. 1–4, Fall 1993.

DTMonitor Newsletter, vol. 3, No. 2, Summer 1993.

Teague, Paul E., et al. Prototyping Expands Design's Portfolio, *Design News*, Jun. 21, 1993.

Lom–1015 brochure entitled "The Power of Lom is now within reach", undated.

Stratasys™, Inc. brochure for FDM 1000®, undated.

* cited by examiner

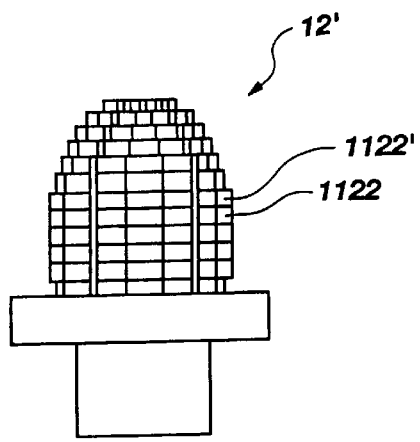
Fig. 14
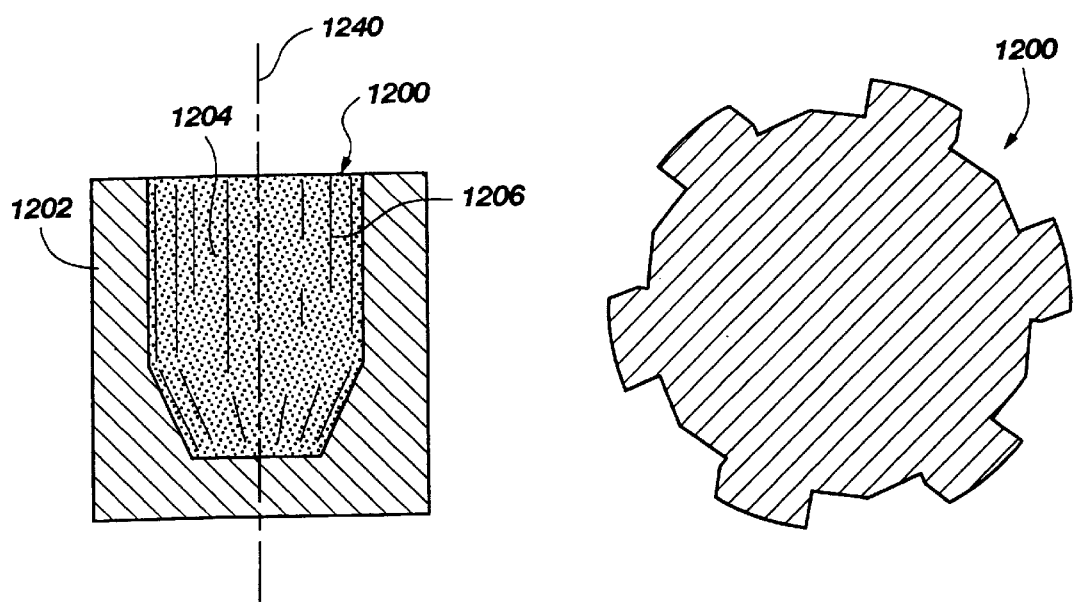
Fig. 15
Fig. 16

METHOD OF MANUFACTURING BITS, BIT COMPONENTS AND OTHER ARTICLES OF MANUFACTURE

This application is a continuation-in-part of U.S. patent application Ser. No. 08/691,863 filed Aug. 2, 1996, now U.S. Pat. No. 5,957,006 which is a continuation of U.S. patent application Ser. No. 08/438,200, filed May 9, 1995, now U.S. Pat. No. 5,544,550, which is a divisional of U.S. patent application Ser. No. 08/213,866, filed Mar. 16, 1994, now U.S. Pat. No. 5,433,280. This application is also a continuation-in-part of U.S. patent application Ser. No. 08/719,254, now U.S. Pat. No. 6,073,518 filed Sep. 24, 1996, and Ser. No. 08/719,281, filed Sep. 24, 1996 now U.S. Pat No. 5,839,329. This application is also related to U.S. patent application Ser. No. 09/061,569, filed Apr. 16, 1998 now U.S. Pat. No. 6,089,123, which is a divisional of U.S. patent application Ser. No. 08/719,254.

BACKGROUND OF THE INVENTION

1. Field of the Invention

The present invention relates generally to a method of fabricating rotary bits and components thereof for drilling subterranean formations. Particularly, the inventive method relates to manufacturing a "green" bit body or bit body component from particulate matter, machining the "green" bit body to define various structures and features, and binding the particles to one another. The method may be employed to fabricate an entire bit body, or bit body components which may be subsequently assembled with other components to form the bit body.

2. State of the Art

A typical rotary drill bit includes a bit body secured to a steel shank having a threaded pin connection for attaching the bit body to a drill string and a crown comprising that part of the bit fitted with cutting structures for cutting into an earth formation. Generally, if the bit is a fixed-cutter or so-called "drag" bit, the cutting structures include a series of cutting elements formed, at least in part, of a super abrasive material, such as natural diamond or polycrystalline diamond. The bit body is generally formed of steel or a matrix of hard particulate material such as tungsten carbide (WC) infiltrated with a binder, generally of copper alloy.

In the case of steel body bits, the bit body is typically machined from round stock to the desired shape, although cast bits are known in the art. Internal passages for delivery of drilling fluid to the bit face and topographical features defined at precise locations on the bit face may be machined into the bit body using a computer-controlled five-axis machine tool. Hardfacing for resisting abrasion during drilling is usually applied to the bit face and to other critical areas of the bit exterior, and cutting elements are secured to the bit face, generally by inserting the proximal ends of studs on which the cutting elements are mounted into apertures bored in the bit face. The end of the bit body opposite the face is then threaded, made up and welded to the bit shank.

In the case of a matrix-type bit body, it is conventional to employ a preformed, so-called bit "blank" of steel or other suitable material within the bit body matrix for attachment of the bit body to a hardened American Petroleum Institute (API) thread connection. The blank may be merely cylindrically tubular, or may be fairly complex in configuration and include protrusions corresponding to blades, wings or other features on and extending from the bit face. Other preform elements or displacements, comprised of cast resin-coated sand or, in some instances, tungsten carbide particles in a binder, may be employed to define internal passages for delivery of drilling fluid to the bit face, as well as cutting element sockets, ridges, lands, nozzle displacements, junk slots and other external topographic features of the bit. The blank and other displacements are placed at appropriate locations and orientations in the mold used to cast the bit body. The blank is bonded to the matrix upon cooling of the bit body after infiltration of the tungsten carbide particles with the binder in a furnace, and the other displacements are removed once the matrix has cooled. The upper end of the blank is then threaded, made up with a matingly hardened, threaded shank, and the two welded together. The cutting elements (typically diamond, and most often a synthetic polycrystalline diamond compact or PDC) may be bonded to the bit face during furnacing of the bit body if thermally stable PDC's, commonly termed TSP's (Thermally Stable Products), are employed, or may be subsequently bonded thereto, usually by brazing or mechanical affixation.

As may be readily appreciated from the foregoing description, the process of fabricating a matrix-type drill bit is a somewhat costly, complex multi-step process requiring separate fabrication of an intermediate product (the mold) before the end product (the bit) can be cast. Moreover, the blanks, molds, and any preforms employed must be individually designed and fabricated.

The mold used to cast a matrix body is typically machined from a cylindrical graphite element. For many years, bit molds were machined to a general bit profile, and the individual bit face topography defined in reverse in the mold by skilled technicians employing a profile mold and wielding dental-type drills and other fine sculpting tools. In more recent years, many details may be machined in a mold using a computer controlled five-axis machine tool. In some cases, the mold fabrication process has been made faster and less costly by use of rubber displacements duplicating in fine detail the topography of an entire bit profile and face, which displacements are then used to cast a ceramic bit mold of appropriate interior configuration, which is then used to contain the blank and matrix particles to cast a bit body.

While matrix-type bits may offer significant advantages over prior art steel body bits in terms of abrasion- and erosion-resistance, and while recent advances in matrix technology have markedly increased the toughness and ductility of matrix bodies, in many cases, the higher cost of a matrix-type bit and the longer time to fabricate same may result in the customer choosing a cheaper steel body bit with a faster delivery time. In either case, the customer must choose between a tough but less abrasion-resistant bit and a more expensive, highly abrasion- and erosion-resistant bit with reduced toughness.

One method that is not so time-consuming and costly as traditional matrix-type fabrication techniques is layered-manufacturing as disclosed in U.S. Pat. No. 5,433,280, assigned to the assignee of the present invention and incorporated herein for all purposes by this reference. The '280 patent discloses a method of fabricating a drill bit body or bit component in a series of sequentially superimposed layers or slices. As disclosed, a drill bit is designed as a three-dimensional "solid" model using a computer-aided design (CAD) program, which allows the designer to size, configure and place all internal and external features of the bit, such as (by way of example) internal fluid passages and bit blank voids, and external cutter receptacles, rakes and locations, as well as the height, thickness, profile and orientation of lands and ridges on the bit face and the orientation, depth and profile of waterways on the bit face and junk slots on the bit gage. The CAD program then provides an ".STL" file (i.e., a file which represents the surface of the bit body), which may later be transformed into a solid model and numerically "sliced" into a large number of thin, planar layers by known processes employing known computer programs.

After the mathematical slicing or layering is performed, a horizontal platen is provided on which a granular or particulate material such as a tungsten carbide coated with a laser-reactive bonding agent such as a polymer, a resin, and/or a low melting point metal such as Wood's metal or a lead alloy, or tungsten carbide intermixed with such a laser-reactive bonding agent is deposited in a thin, uniform layer. A finely focused laser, a focused light source such as from an incandescent or discharge type of lamp, or other energy beam, programmed to follow the configuration of the exposed section or layer of the bit body, is directed on the powder layer to melt the bonding agent and bond the metal particles together in the areas of the layer represented as solid portions of the bit in the model. Another layer of powder is then substantially uniformly deposited over the first, now-bonded layer, after which the metal particles of the second layer are bonded to each other and simultaneously to the first layer by the laser. The process continues until all layers or slices of the bit, as represented by the solid model, have been deposited and bonded, resulting in a mass of bonded-particulate material comprising a bit body which faithfully depicts the computer model in every dimensional respect. In areas of each layer which are not to form a part of the completed article, the laser or other energy beam does not traverse and bond the particles. Thus, a drill bit, or at least a bit body comprised of bonded-particulate material, may be fabricated directly from the CAD-generated solid model without the necessity of designing and fabricating molds and without the delicate, artistic hand labor currently required for bit details.

In a variation of the layered-manufacturing process, a tungsten carbide or other suitable powder or mix of powders (either metallic or nonmetallic) having the desired physical characteristics for a matrix may be uniformly premixed with a powdered binder, such as a metallic or nonmetallic (e.g., polymeric) binder powder, the premix deposited in layers and the binder powder at least partially fused by a laser to bond the tungsten carbide particles into a matrix and define the bit body shape. After the layered-manufacturing process is completed, since the binder is already in place, the bit body may be heated to effect complete in situ infiltration of the matrix. Alternatively, layers of binder powder and matrix powder may be alternately deposited. In either case, additional binder may be placed on top of the bit body to infiltrate and fill any voids in the binder-consolidated metal powder matrix.

In another variation of the layered-manufacturing process, a binder-coated matrix material (e.g., tungsten carbide) may be dispersed into a layer, and the binder coating melted with a laser sufficiently to cohere the particles of each layer and adjacent layers to one another. The bit body may then be heated to complete the in situ infiltration of the matrix. Additional binder may also be employed, as noted above.

In yet another variation of the layered-manufacturing process, a layer of particulate material is dispersed into a layer, and the particles in selected areas of the layer affixed to one another by a polymeric adhesive or non-polymeric binder (e.g., water-glass). Due to the selective deposition of binder over the layer of particulate material in order to define a desired solid structure, this type of layered-manufacturing is typically referred to as "3D-Printing".

The bit body may then be placed in a furnace where it may be preheated to substantially remove the bonding agent. In such instances, certain metal powders may be at least preliminarily sintered or fused, such sintering to be enhanced or completed, if necessary, in a later furnacing operation.

If a powdered metal coated with bonding agent or metal intermixed with a bonding agent is employed as the particulate material as mentioned above, the resulting bit body is a porous and permeable metal mass akin to a sponge or an open-celled foam which can be imbibed with suitable hardenable infiltrants, either metallic, non-metallic, or a combination thereof, to complete the bit body. If an infiltrant in liquid form at room temperature, such as certain polymers, is employed, the bit may be mass infiltrated via capillary action, gravity, and/or pressurized flow at room temperature, while if an infiltrant that is solid at room temperature is employed, the bit would be mass infiltrated by capillary action, gravity, and/or pressurized flow in a furnace, induction coil, or by other heating methods known in the art of fabricating matrix-type drill bits from loose tungsten carbide powders contained in a mold.

The infiltration process may include pouring a castable material, such as ceramic, plaster, graphite slurry or other similar materials known in the art and able to withstand the high temperatures typically encountered during the infiltration process, around the particulate-based bit body or assembly to provide solid structure support upon solidification of the castable material. Similarly, the bit body or assembly may be dipped one or more times into a castable material, such as a ceramic, plaster, or graphite slurry, to form a relatively rigid material around the bit body. In either case, it is preferable to preplug any orifices or openings leading to internal passageways in the bit body so that castable material that may otherwise be difficult to remove therefrom does not accumulate inside the bit body or assembly. Such plugs may be comprised of sand, graphite particles, clay or other suitable materials known in the art.

Alternatively, the particulate-based bit body or assembly may be placed in a refractory vessel with granular material packed around the particulate-based bit body up to its uppermost surface. This granular material substantially completely surrounds all surfaces of the bit body and may be vibrated to more densely pack the granular material. Because the granular material maintains its granular form during infiltration and is non-wettable by the infiltrant, the granular material effectively forms a "pliable" mold. That is, the granular material continues to provide structural support for the bit body during infiltration as dimensions of the bit body change, such as by shrinkage that may occur as a bonding agent employed to preliminarily hold the metallic particles of the bit body together vaporizes. The granular material may not substantially sinter, tack, or otherwise strengthen during the infiltration process so as to avoid complicating its removal from the bit body following infiltration, and thus continues to support the bit body substantially throughout infiltration without substantial change in its supporting physical characteristics.

A granular material that sinters, chemically reacts, or otherwise strengthens during the infiltration process may be used to provide a more rigid mold to support the bit body. Such a mold would be particularly beneficial for bit bodies that undergo little or no shrinkage.

In addition, it may be sufficient that a substantially rigid mold may be employed to provide support primarily during the first stages of infiltration, wherein the metallic particles of the layered bit body are imbibed with a sufficient amount of infiltrant and/or sufficiently sintered so that the bit body can structurally support itself.

Additionally, a mold material may be selected that conforms by shrinking and/or expanding along with any shrinkage and/or expansion of the bit body during the infiltration process to maintain a substantially impermeable, conforming support structure. Such a mold also helps prevent infiltrant material from flowing out of the bit body and pooling in gaps that may otherwise form between the bit body and the interior surface of the mold if the dimensions of the mold remain constant relative to the varying dimensions of the bit body during infiltration.

All of the materials used to form the support structure and/or fill any internal cavities in the bit body are formed from materials that are non-wettable by the infiltrant. That is, these materials do not absorb or otherwise chemically or mechanically bond to or react with the infiltrant utilized for infiltration. Rather, these materials form a barrier, because of their non-wettable quality, around the bit body such that the infiltrant stays contained within the bit body and does not bind the support structure to the bit body. In addition, such molds or support structures may be formed from materials that are substantially permeable to gases and vapors generated during the infiltration process, so as to preclude the formation or retention of gas or vapor voids in the bit body being infiltrated.

If a wettable material is used to form the support structure, the bit body may be coated with an infiltrant-resistive material, such as boron nitride water-glass or other suitable materials known in the art, prior to being placed within, or surrounded by, the support material. The boron nitride may be simply sprayed or painted onto various surfaces of the bit body, or the bit body may be dipped into a container of a boron nitride suspension to form a barrier through which the infiltrant cannot flow out of the bit body and imbibe the wettable support structure. Thus, the non-wettable and impermeable (by the infiltrant) resistive coating keeps the molten infiltrant contained within the layered bit body. In addition, such a coating may aid in forming a better surface finish for the bit body as it creates an intermediate shell to which the layered part and the infiltrant can conform during infiltration. Moreover, due to its liquid consistency, the coating fills small voids, vugs or intricately configured areas that may not be completely, intimately contacted by the surrounding support material. During the coating process, it is generally desirable to leave at least one surface uncoated so that the bit body has at least one non-resistive or wettable surface through which to imbibe additional infiltrant, even if infiltrant is already present in the preformed particulate-based bit body. Such a resistive coating may also be used in conjunction with variations of the infiltration process, whether the support material is wettable or non-wettable, to help form a better surface finish and help ensure that the infiltrant does not flow out of the particulate-based bit body and into the support structure, pool in any voids, gaps or vugs present between the bit body and the support structure, or form an unwanted skin of infiltrant on the outer surface of the bit body.

After the particulate-based bit body has been properly supported, the article of manufacture and any supporting materials and/or structures are placed within a traditional furnace, an induction coil furnace, or other heating apparatus known in the art along with an infiltrant and heated until the infiltrant melts and substantially fully permeates the article of manufacture through the free surface exposed to the infiltrant. The materials used to infiltrate the particulate-based bit body are typically copper-based alloys containing other elements such as nickel, as known in the art of fabrication of matrix-type drill bits.

U.S. Pat. No. 5,433,280 also discloses a tungsten carbide or other suitable powder or mix of powders (either metallic or non-metallic) having desired physical characteristics for a matrix substantially uniformly premixed with a powdered polymeric (or other nonmetallic) or metallic infiltrant powder, the premix deposited in layers and the infiltrant powder at least partially fused by a laser to bond the tungsten carbide particles into a matrix and define the bit body shape. After the layering and fusing process is completed, since the infiltrant is already in place, the bit body is heated in a furnace to effect complete in situ infiltration of the matrix. In another alternative to the foregoing procedure, layers of matrix powder alternating with layers of infiltrant powder are deposited. In either case, additional infiltrant may be added during infiltration to fill any infiltrant-deprived voids in the infiltrant-consolidated metal powder matrix. If an infiltrant-coated tungsten carbide or other suitable powder or mix of powders in a layered fashion is employed, a laser may be used to melt the infiltrant coating at least enough to cohere each layer, and the completed bit body placed in a furnace for an in situ infiltration of the bit body, with additional infiltrant being provided if necessary, as noted above.

A support structure may also be employed with a bit body comprised of metallic particles intermixed with particles of an infiltrant material. With such a particulate-based bit body, it may not be necessary to leave at least one surface exposed for additional infiltrant to be imbibed into the bit body. Such a particulate-based bit body, however, may require structural support as described above.

It is known, however, that during the layered-manufacturing of bit bodies of bonded particulate material, anisotropies may occur. For example, a bit body may have a generally oval- or elliptical-shaped transverse cross section rather than the generally circular transverse cross-section that is typically desired. Similarly, the size, shape, and alignment of various internal and external features of the bit may be undesirably altered during layered-manufacturing processes.

It is also known that layer-manufactured bit bodies typically include surfaces which have a "stepped" appearance, which may be somewhat undesirable in features of the bit body which have low dimensional tolerances. Moreover, due to the complexity of state-of-the-art bit bodies, layered-manufacturing of porous bit body matrices typically requires the fabrication of very thin layers of complex shapes. Thus, the accurate and precise manufacture of layers with low dimensional tolerances may be somewhat time consuming.

Therefore, it would be advantageous to provide a relatively simple method of manufacturing a bit, bit component, or other article of manufacture that reduces the time and cost of producing the article of manufacture by layered-manufacturing processes without sacrificing the orientation, alignment and detail of the various features of the article of manufacture. Moreover, it would be advantageous to provide a method that corrects anisotropies, "stepping", and other imperfections that may be generated during layered-manufacturing processes.

SUMMARY OF THE INVENTION

Accordingly, a manufacturing method, which includes selectively removing, or machining, material from a porous matrix, is herein disclosed to fabricate matrix-type rotary bits for subterranean drilling, bit components, and other articles of manufacture in a relatively short amount of time, and without the need for preparation and use of molds for definition of the bit profile, including the face, nose, flank, shoulder, and gage, as well as other, finer details of the exterior surface of the bit. Interior structures of the bit, such as fluid passages, may also be defined in accordance with the manufacturing method of the present invention.

The porous matrix employed in the manufacturing method of the present invention may comprise a layer-manufactured structure, such as those disclosed in U.S. Pat. Nos. 5,544,550 and 5,433,280, the disclosures of each of which are hereby incorporated by reference in their entirety, or a sintered structure, such as the structures manufactured according to the process disclosed in U.S. patent application Ser. No. 08/719,254, filed Sep. 24, 1996, the disclosure of which is hereby incorporated by reference in its entirety.

The machining process of the present invention may also be employed to correct anisotropies or other imperfections that are created during the manufacture of other particulate-based structures, such as layer-manufactured tungsten carbide shells and sintered steel blanks.

Anisotropies, "stepping", and other imperfections that may occur as the particles of resin-coated powder are bonded to one another may be corrected by machining the non-infiltrated bit body, either manually or by automated means, such as with a computer-controlled multiple-axis machine tool type known in the art. Preferably, when automated machining means are employed, the machining process is controlled by a numerically defined tool path patterned after a "solid" CAD model, such as the CAD models that are typically employed in many layered-manufacturing or automated machining processes. In addition, design modifications that have not been incorporated into the CAD model may be made to the porous bit body matrix prior to infiltration.

If a supporting structure has been fabricated around the bit body, the bit body may then be placed in a conventional furnace, an induction furnace, or any other known heating device where the bit body may be preheated to vaporize the resin. It is contemplated that certain resins may be employed that will vaporize when contacted by laser light during the initial layered-manufacturing process and, in such instances, certain metal powders may also be at least preliminarily sintered or fused by the laser, such sintering to be enhanced or completed, if necessary, in a later furnacing operation. Alternatively, such sintering or resin vaporization may be performed prior to machining, which may increase the precision of features of a machined bit body, as deformation of a structure may occur during sintering or other furnacing operations.

If a resin-coated powdered metal or a mixture of powdered resin and powdered metal is employed as the particulate material, as mentioned above, the resulting bit body is a porous and permeable mass, akin to a sponge or an open-celled foam, which can be infiltrated with suitable metallic or nonmetallic binders to complete the bit body. If a nonmetallic binder, such as a polymer, is employed, the bit may be mass infiltrated via gravity, via capillary flow, or under pressure at room temperature, while if a metallic binder is employed, the bit would be mass infiltrated by gravity, by capillary flow, or under pressure at a temperature sufficient to melt the metallic binder, as known in the art.

Another embodiment of the inventive manufacturing method includes the fabrication of a "green" bit body matrix by layered-manufacturing processes, similar to the layered-manufacturing process of the previous embodiment, but in relatively thick layers, which may not include all of the fine details of the "solid" CAD model. By employing a numerically defined tool path that is patterned after the "solid" CAD model, the "green" bit body may be machined by known techniques, such as a multiple-axis machine tool, to create the fine details of the bit body. Alternatively, or in addition, the particulate-based bit body may be machined manually. Additional fine features of the bit body may also be defined by machining. Subsequently, the bit body may be infiltrated by any of the aforementioned variations of the infiltration process.

Similarly, a "green" bit body shell may be layer-manufactured, then subsequently machined to add fine details thereto. The "green" bit body shell may be machined either before or after filling same with a blank and/or particulate material, such as powdered steel or tungsten carbide.

Yet another embodiment of the manufacturing method includes machining a particulate-based block of tungsten carbide, steel, or other bonded particulate material to define a bit body. Particulate-based blocks may be manufactured by placing a resin-coated particulate material into a mold, then heating the mold to a sufficient temperature to soften or melt the resin and thereby bond the particles together. Alternatively, a particulate material may be disposed in a mold with a powdered resin, which is then heated to form the block. The block may have a cylindrical shape or a cross section, taken along a plane perpendicular to the longitudinal axis thereof, which has the general appearance of a corresponding cross section of the bit body, bit body component, or other article of manufacture to be formed therefrom. Alternatively, a particulate-based, generally featureless block may also be fabricated by layered-manufacturing processes. Another exemplary technique for fabricating a particulate-based block includes sintering a mass of particulate material. The resultant particulate-based block is fairly porous, and, therefore, easily machinable.

After the particulate-based block has been fabricated, it may be machined by either manual or automated processes that are known in the art. Various details and features of the bit body may be defined in the block by such machining techniques, as discussed above. Subsequently, the particulate-based bit body may be infiltrated, as discussed above.

As noted above, a mixture of matrix metal powders may be employed in the bit body to reduce the necessary size of the blank or eliminate the need for a blank altogether. A mixed-metal matrix of tungsten carbide and one or more other materials providing enhanced toughness, ductility and/or impact strength, such as disclosed in U.S. Pat. No. 5,090,491, assigned to the assignee of the present invention and incorporated by this reference, may be particularly suitable for fabrication by the method of the present invention.

It is further contemplated that any and all of the embodiments of the method of the present invention may be employed to fabricate a bit body component instead of an entire bit body. In such a variation, an element of the three-dimensional "solid" model is defined by the bit designer and numerically "removed" from the model for separate fabrication as an individual component by the multiple-layering technique previously described. Forming bit body components individually may be advantageous when the bit profile, surface topography or internal configuration is unusually complex, or when it is desired to assemble one or more components fabricated using the method of the present invention as previously described with other components made by other means, such as machining, casting, extrusion, etc. The assembled components may then be infiltrated, as previously described, to form a unitary bit body.

Rotary bits and components thereof fabricated according to the method of the present invention are also contemplated as being within the ambit of this invention. Such bits provide advantageously controlled, precise placement of different bit matrix materials within the bit body or on the surface thereof, as well as the ability to precisely place, configure and orient internal fluid passages, plenums and other voids. In addition, as previously alluded, bits fabricated according to the method of the present invention provide the ability to alter cutter size, placement, orientation and details of the bit surface topography at will via a CAD system and execute such changes in the form of a new "custom" bit design as required.

In another aspect of the present invention, the methods of the present invention may be employed to fabricate a mold from a particulate or powdered material. At least selected particles of mold material are secured to each other by a liquefiable binder, such as a polymeric resin, or by sintering to define a body of the mold. A cavity may be defined in the mold body during the fabrication thereof. The particulate-based mold body is machined to correct any anisotropies or other imperfections in the surface of the mold cavity, to define various features in the mold cavity, or to completely define the mold cavity. A layer of a coating material may be disposed over at least a portion of the surface of the mold cavity to prevent the escape of any binder into the cavity and to prevent any molten material in the cavity from imbibing into the mold body during the formation of an article of manufacture with the mold.

Other advantages of the present invention will become apparent to those of skill in the art through a consideration of the ensuing description, the accompanying drawings, and the appended claims.

BRIEF DESCRIPTION OF THE DRAWINGS

FIG. 14 is a schematic representation of the layered-manufacture of a drill bit in accordance with a second embodiment of the present invention, wherein the drill bit has relatively thick layers;

FIGS. 15 and 16 schematically represent a process of fabricating a porous bit block, from which a bit body may be defined in accordance with a third embodiment of the method of the present invention;

DETAILED DESCRIPTION OF THE PREFERRED EMBODIMENTS

Figure 1:
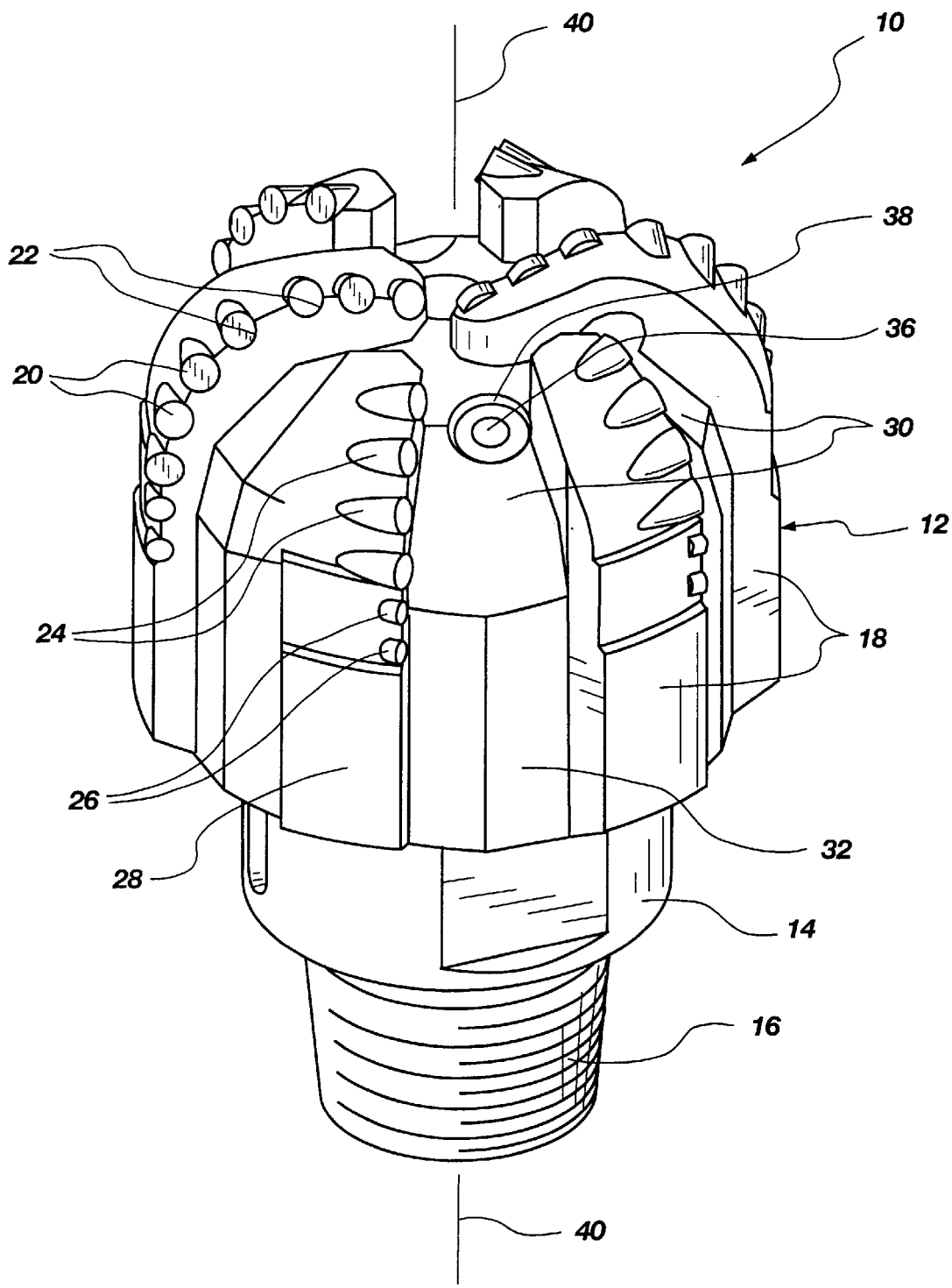
FIG. 1 is a perspective view of a solid or three-dimensional model of a drill bit as might be designed by a CAD system.
Figure 2:
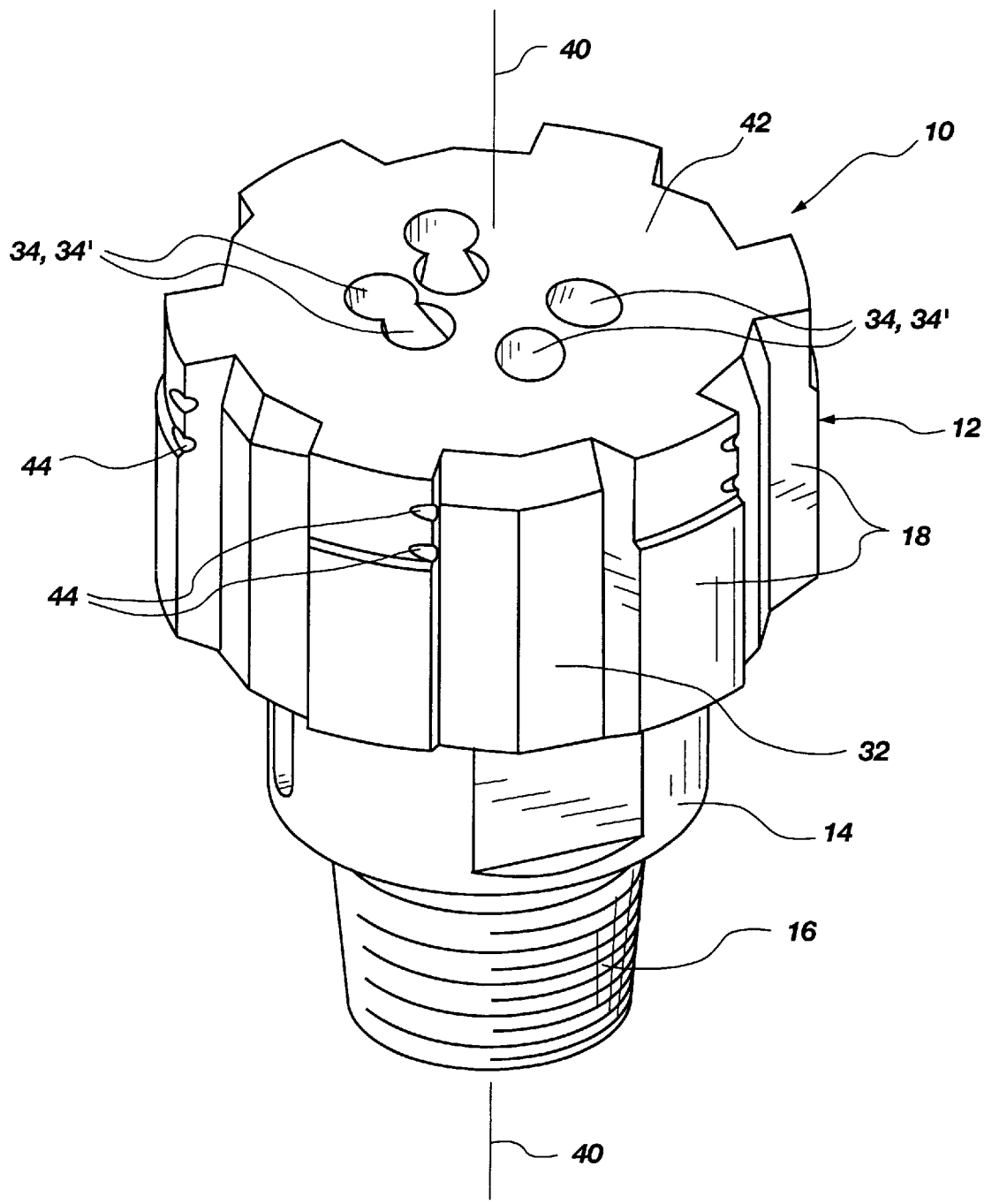
FIG. 2 is an enlarged perspective view of the drill bit of FIG. 1, sliced transversely to the longitudinal bit axis to expose an interior section.
Figure 3:
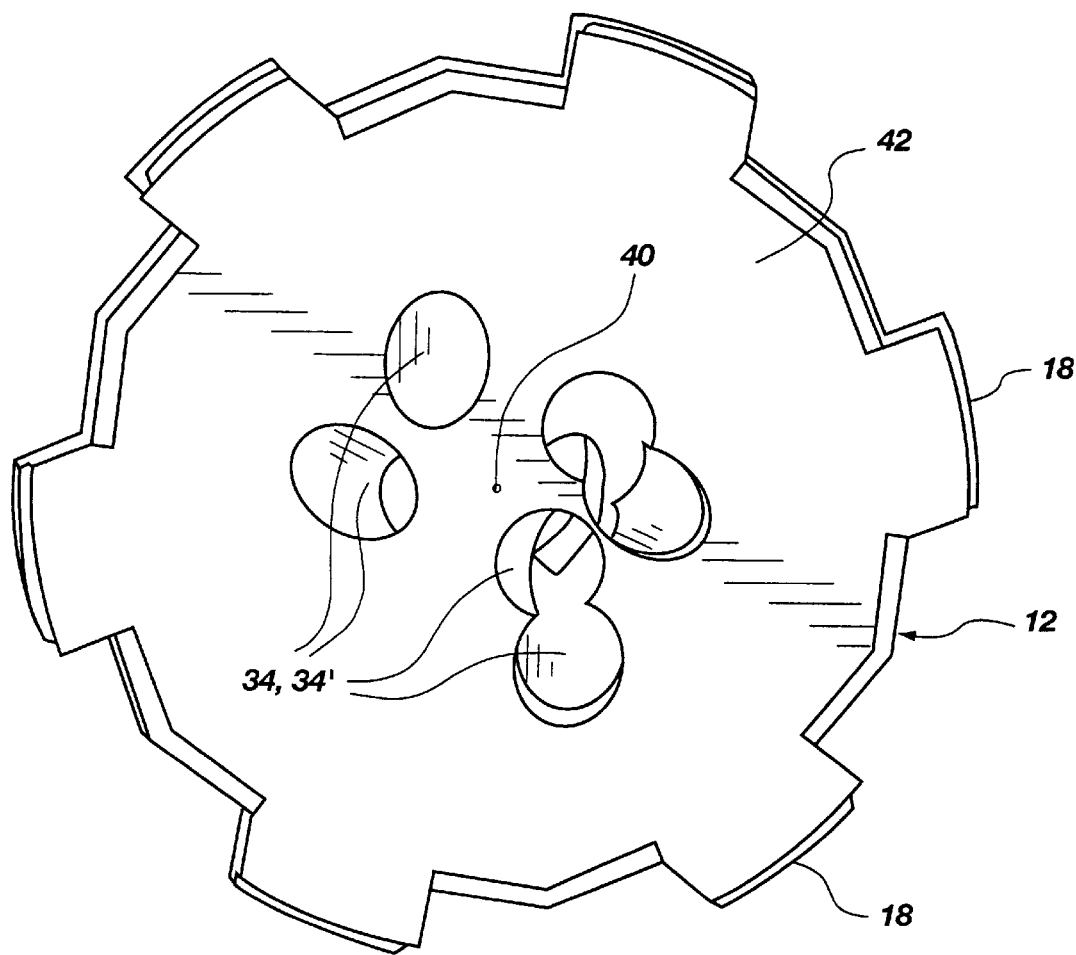
FIG. 3 is an enlarged top elevation of the exposed slice or layer of the drill bit segment depicted in FIG. 2.

Referring now to FIGS. 1 through 3 of the drawings, an exemplary drill bit 10 is depicted as three-dimensionally modeled by a state-of-the-art CAD system. Such systems are well-known and widely used, and a particularly suitable, commercially available CAD system for implementation of the present invention is the Pro/ENGINEER, offered by Parametric Technology Corporation. Drill bit 10, as shown, includes a variety of external and internal components, such as bit body 12 that may be secured to a blank (not shown), which is secured to a tubular bit shank 14 having a threaded pin connection 16 at the free end thereof and six blades or wings 18 carrying cutting elements 20 placed in cutter pockets 22 and supported from the rear by inclined buttresses 24. Gage trimmers 26 are set immediately adjacent and above (as depicted in the drawing figures) gage pads 28. Blades 18 are separated by generally radially extending fluid courses 30 leading to junk slots 32, fluid courses 30 and junk slots 32 being provided in operation with drilling fluid ("mud") from the drill string through bit shank 14 communicating with internal fluid passages 34 leading to nozzles 36 in cavities 38 opening onto fluid courses 30. Blades 18, fluid courses 30, and the topographical details thereof collectively define what may be termed the "bit face;" being the surface of the bit in contact with the undrilled formation at the bottom of the borehole. The exterior shape of a diametrical cross-section of the bit body 12 taken along the longitudinal bit axis 40 defines what may be termed the bit or "crown" profile.

Layered-Manufacture of the Article

As shown in FIG. 2 of the drawings, a solid, three-dimensional model of bit body 12 may be numerically "sliced" along any desired plane and, in this instance, along a plane perpendicular to the longitudinal bit axis 40 of bit 10. Looking at surface 42 in FIG. 2, it is readily apparent that the model of bit 10 may be readily numerically characterized as a series of superimposed, primarily two-dimensional thin layers of gradually varying cross section, which two-dimensional layers, when completely stacked, define the three-dimensional drill bit model depicted in FIG. 1. As shown in both FIGS. 2 and 3, surface 42 includes apertures or voids where segments 34' of internal fluid passages 34 exist, the contiguous segments 34' in superimposed layers or slices comprising complete internal fluid passages 34 in the bit model as representative of drill bit 10. FIG. 2 also shows voids 44 in the surface of the bit body where gage trimmers 26 have been deleted, the method of the present invention providing a bit body ready for the addition of cutting elements 20, gage trimmers 26 and nozzles 36.

Figure 4:
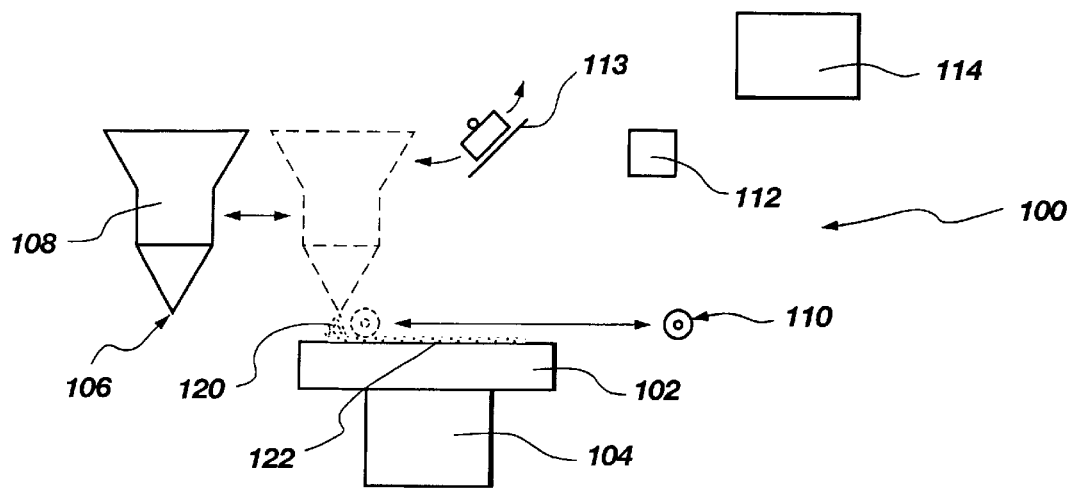
FIG. 4 is a schematic of a first preferred computer-controlled layering apparatus suitable for use in fabrication of a drill bit according to a preferred layered-manufacturing process of the method of the present invention.

Referring now to FIG. 4 of the drawings, an exemplary apparatus 100 for the fabrication of a rotary drag bit in accordance with the present invention is schematically illustrated. Apparatus 100 includes a horizontal platen 102 on which a bit body 12 (see FIG. 1) is to be formed. The platen 102 is preferably vertically movable in precise increments, as by a stepper motor assembly or other means 104. A particulate spreader, comprising a linearly-extending feed head 106 at the bottom of hopper 108, is horizontally movable across and above platen 102 to deposit a layer of particulate material 120, or particles, on platen 102. Hopper 108 may be vibrated to facilitate the flow of particulate material 120 and to render the flow more uniform, if desired. Vertically-fixed, horizontally-extending roller or scraper bar or blade 110 is also horizontally movable across platen 102 and may, if desired, be suspended from hopper 108. Fixative head 112 is suspended above platen 102. Fixative head 112 may comprise one of a variety of assemblies, depending upon the nature of the particulate material 120 employed to fabricate the bit body and the desired binder alternative employed to perform the method of the invention. Fixative head 112 may comprise, for example, and not by way of limitation, a laser, an ink-jet nozzle or a metal spray gun. When fixative head 112 includes a laser, apparatus 100 may also include a galvanometer 113 with one or more pivotal mirrors. The sequence of operation and movements of platen 102, hopper 108, roller 110 and fixative head 112 are controlled by a computer 114 employing a suitable machine control program as is currently known in the art. Computer 114 may comprise a commercially available personal computer employing an Intel 486-series, Pentium®-series, or Pentium® II-series microprocessor. Vendors offering suitably-programmed computers employing systems responsive to CAD .STL file formats and associated hardware adaptable to the method of the present invention include DTM Corporation, Austin, Tex.; Soligen, Inc., Northridge, Calif.; Stratasys, Inc., Eden Prairie, Minn.; Helisys, Inc. of Torrance, Calif.; and 3D-Systems, Inc., Valencia, Calif.

Figure 4A:
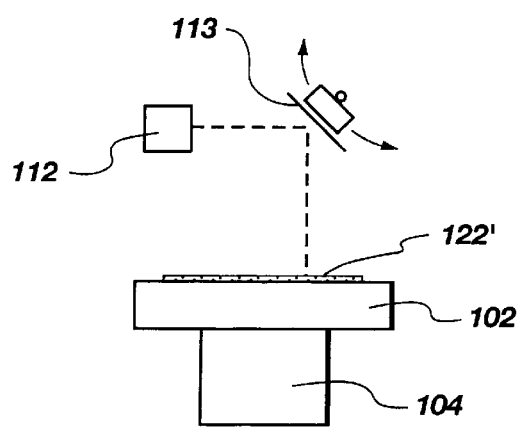
FIGS. 4A–4D are schematics depicting use of the apparatus in the manufacture of a bit.
Figure 4B:
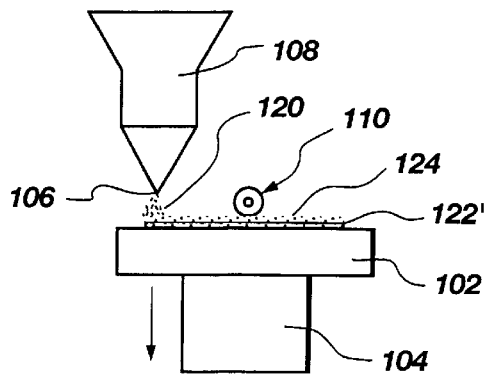
Figure 4C:
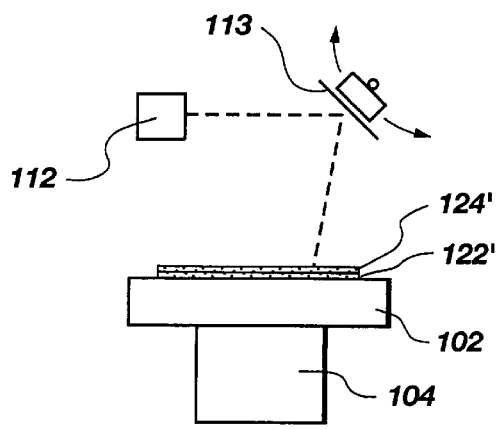
Figure 4D:
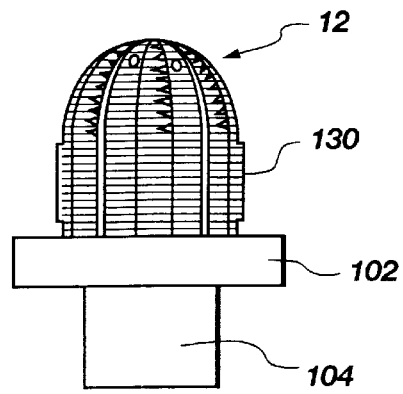
Figure 4E:
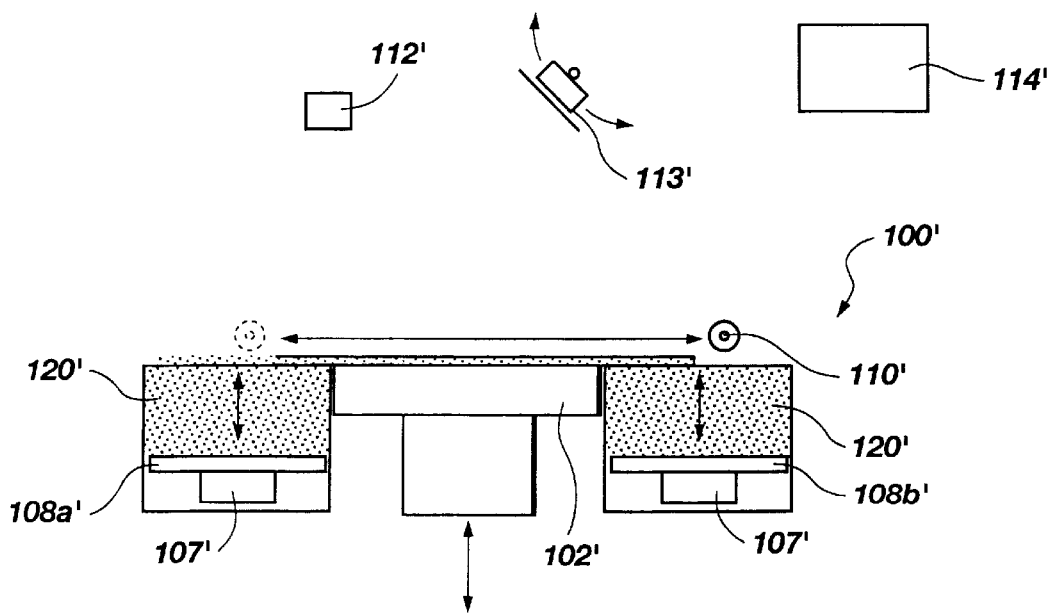
FIG. 4E is a schematic representation depicting another apparatus that may be used in the manufacture of a bit.

With reference to FIG. 4E, an alternative apparatus 100' for fabricating a rotary drag bit in accordance with the present invention is illustrated. Apparatus 100' includes a horizontal platen 102', similar to platen 102 of apparatus 100 illustrated in FIGS. 4–4D, on which a bit body 12 (see FIG. 1) is to be formed. A particulate spreader, comprising cartridges 108a' and 108b' disposed beneath platen 102' and a roller or scraper bar or blade 110' horizontally movable across platen 102', deposits a layer of particulate material 120', or particles, over platen 102' in substantially uniform thickness. Cartridges 108a' and 108b'0 are preferably vertically movable in precise increments, as by a stepper motor assembly or other means 107' in order to move particulate material 120' upward for disposal on platen 102'. Apparatus 100' also includes a fixative head 112', a galvanometer 113' including at least one mirror, and computer 114', similar to those of apparatus 100, described above in reference to FIGS. 4–4D.

Referring again to FIGS. 4–4D, in the layered-manufacturing process of the inventive manufacturing method, the particulate material 120 comprises resin-coated particles of metal (e.g., tungsten carbide, iron, steel, Invar) ceramics or a mixture of any of the foregoing, which particles 120 are deposited by the horizontal movement of hopper 108 over platen 102 with the latter in its uppermost position. Roller or scraper 110 spreads and smooths particles 120 into a first thin layer 122, or particle layer, of substantially uniform thickness (for example, 0.003 to 0.020 inches). Thereafter, fixative head 112, which comprises a laser, directs a laser beam toward the mirrors of galvanometer mirrors 113, which reflect the laser beam toward selected regions of layer 122 in order to melt the resin and thereby affix the particles 120 of the selected regions of layer 122 in a regular horizontal pattern representative of a first or lowermost transverse layer or slice of bit body 12 (see FIG. 2), as numerically defined and stored in computer 114. The laser beam is directed to impinge on particulate material layer 122 in those areas where bit body 12 is comprised of solid material and avoids those areas wherein a segment 34' of an internal fluid passage 34 or other void (for example, a plenum) exists within bit body 12. As shown in FIG. 4A, the laser melts the resin and fuses the metal particles together, resulting in what may be termed a particle layer 122' having the peripheral outline of bit body 12 at that vertical or longitudinal level, apertures or voids in that layer remaining as loose, unfused particles 120. With some metal powders, sintering may also occur. The laser is then withdrawn and, as shown in FIG. 4B, platen 102 indexed downwardly a vertical distance which may or may not be equal to the thickness of particle layer 122' (i.e., a layer-manufactured structure may have layers of different thicknesses); a second layer 124 of particles 120 is deposited by feed head 106 of hopper 108, then spread and smoothed by roller or scraper 110, as previously described. As shown in FIG. 4C, the laser is again directed, this time at layer 124', to follow a horizontal pattern representative of a second, higher layer or slice of drag bit body 12, as numerically defined and stored in computer 114, fusing second layer 124 into second preform layer 124', which is also simultaneously fused to first particle layer 122'. It will be appreciated that particle layers 122' and 124' have been exaggerated in thickness for purposes of illustration. Since the crown profile of bit body 12 is not cylindrical, but tapered, and the internal fluid passages extend laterally, as well as longitudinally, within bit body 12, the net result is that preform second layer 124', while contiguous with particle layer 122', may not be identical thereto.

The particle deposition, smoothing and selective fusing of each successive preform layer is continued under computer control for hundreds or even thousands of layers until a recognizable three-dimensional structure as depicted in FIG. 2 gradually emerges, and the layering process is further continued until a completed bit body 12, as depicted in FIG. 1 (but without cutting elements 20, gage trimmers 26, nozzles 36, shank 16 or blank), is achieved, as shown in FIG. 4D.

It will be appreciated that the layered-manufacturing process may be employed with a preformed bit blank, as used in prior art fabrication techniques for matrix bits, the blank being placed on platen 102 and the layers of particles deposited around the blank. Of course, with this variation of the method, use of a roller or scraper is not practical. Therefore, spreading and smoothing of each particle layer 122', 124' and so on, may be effected by vibration of platen 102, and the volume of particulate material more carefully controlled.

A variation of the layered-manufacturing process employs a premix of powdered matrix material and powdered binder, which is deposited in layers on platen 102, as described above. However, in lieu of a complete mass binder infiltration process, as previously described, the laser is employed to effect what may be termed a preliminary in situ layer-by-layer infiltration process by heating and liquefying the binder to bond the top layer of unconsolidated matrix particles to each other and to the previously bonded layers below. By employing such a method, drill bit body 12 is finished at the conclusion of the layering process, and only infiltration with additional binder is required to eliminate voids in the bit body if some porosity cannot be tolerated. The powdered binder may be, as previously described, either nonmetallic or metallic. Instead of premixing matrix and binder powder, separate layers of each may be applied (first matrix powder, then binder powder before the binder is liquified by laser heating and penetrates between the underlying matrix particles). A further alternative, to avoid potential uneven distribution of matrix and binder particles in a premix, is to employ binder-coated matrix particles to ensure that each matrix particle is wetted by binder and bonded to an adjacent matrix particle. The coated particles are heated by laser to melt the binder and consolidate the matrix particles with each other and with the layer below.

Alternatively, the layered-manufacturing process may be carried out by using uncoated particles of metal or other suitable material deposited on platen 102, as previously described. In this instance, however, fixative head 112 may comprise one or more ink-jet nozzles such as is employed in printing mechanisms or, alternatively, a metal spray gun. Fixative head 112 deposits a liquid binder over the powder particles, penetrating therebetween and solidifying, thus bonding the particles of the uppermost layer, to each other and to the underlying layer which has previously been consolidated. If an ink-jet type binder deposition process is employed, the binder may comprise a non-metallic binder, such as a polymer compound. Alternatively, a metallic binder such as a copper or zinc alloy or Kirksite, a proprietary alloy available through Industrial Modern Pattern and Mold Corp., may be employed. In the case of a metal alloy, the binder may be supplied in wire form, which is liquified (as by electric arc heating) and sprayed onto the uppermost particulate layer. Another alternative is to liquify the distal end of the binder wire with a laser or other heating means immediately above the unconsolidated powder layer rather than using a metal spray.

Figure 5:
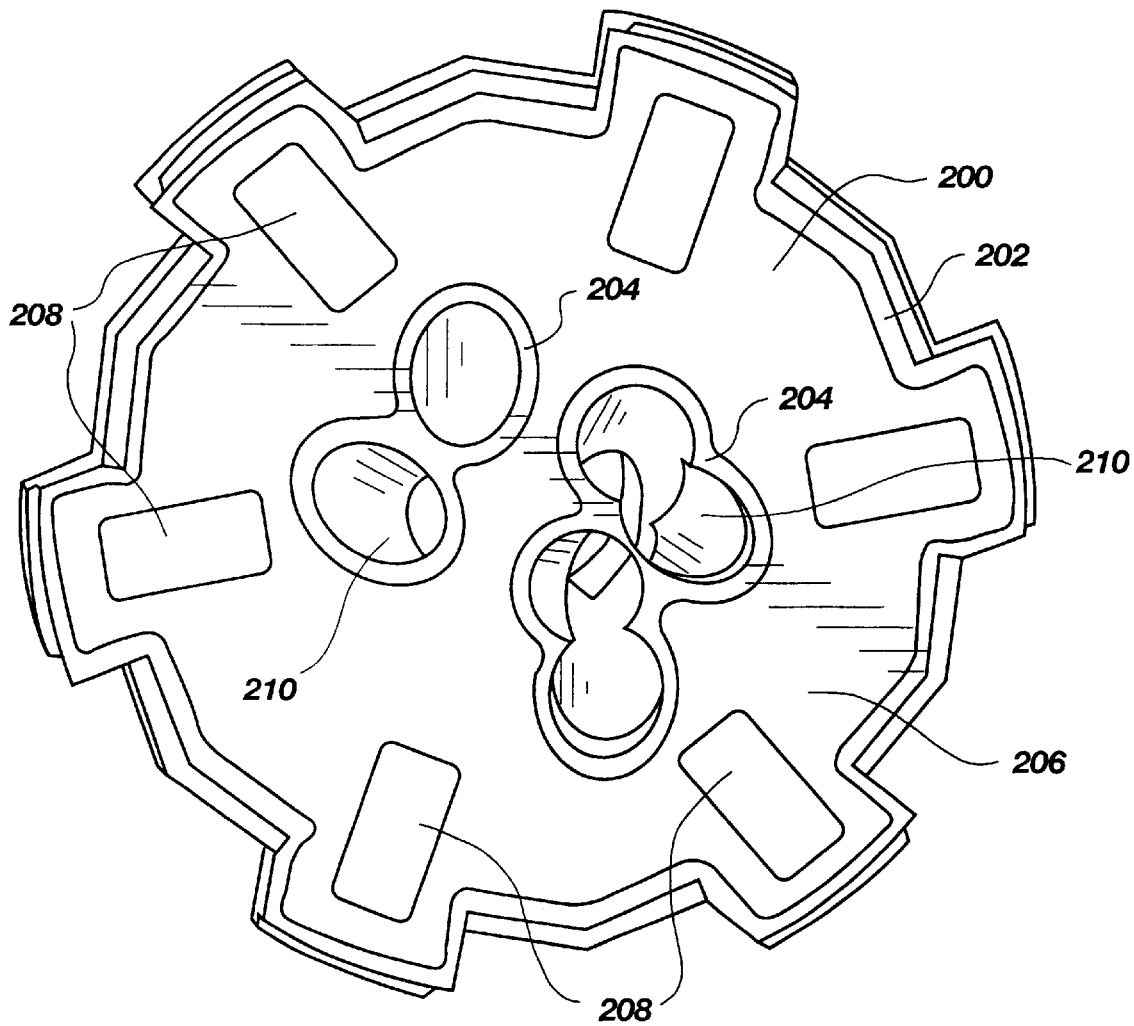
FIG. 5 is a top elevation of the exposed slice or layer of another drill bit model, depicting the use of several different powders to provide different physical characteristics for various portions of the bit slice or layer and contiguous portions of adjacent slices or layers.

In practicing the layered-manufacturing process, further variations are also contemplated. For example, different matrix powders may be separately deposited on platen 102 at appropriate and desired locations, in order to provide different portions of the drill bit with different physical characteristics. Specifically, particles of tungsten carbide, a ceramic, or other hard material may be deposited by a hopper or other deposition device controllably moved in the X-Y plane at the periphery of a layer being formed on the platen or on an underlying layer to provide an abrasion- and erosion-resistant outer shell for the bit body, and at the CAD-indicated locations for internal fluid passage segments 34' (see FIGS. 2 and 3) to provide a similarly abrasion- and erosion-resistant wall segment surrounding the passage segment 34'. The other matrix particles employed in the layer being formed may comprise iron, steel, Invar, nonferrous metals, ceramics, or other tough and ductile materials (e.g., Hoeganaes Ancormet 101, comprised mostly of iron with 0.19% C or 4600V, a steel powder (which has a lower melting point than Hoeganaes Ancormet 101) containing 1.86% Ni, 0.53% Mo, 0.17% Mn, 0.11% Cu, and trace amounts of Cr, C, S, Si and P) to so enhance the toughness and ductility of the bit body. After the two types of powders have been deposited (two types being only by way of example and not limitation), the powder layer may be sintered or otherwise bonded, the end result being an exposed layer or slice 200 of a bit body, as depicted in FIG. 5 of the drawings. Exposed layer 200, shown in the finished form as it would be as a part of bit body 12 (see FIG. 2), includes a hard outer periphery 202 and passage wall segments 204 for passage segments 34' and a tough and ductile major portion, or second powdered material 206, providing the desired robust physical characteristics for the bit body as a whole. Aside from the use of the two powders, the method of the present invention is performed in the manners disclosed above.

As an alternative to selective placement of different powdered materials in a layer and bonding of the entire layer at once, the same result may be achieved by a variation of the method which is easier to effectuate in practice and which may provide more precise boundaries between the different materials in a layer. In the variation, a first powdered material is deposited over the entire cross-section of a bit body layer and then selectively bonded as by a laser in desired locations. Powder in the unbonded areas of the layer is then removed and recovered by vacuuming, and a second powdered material is then deposited over the entire cross section and selectively bonded together and, preferably, to the first powdered material, with unbonded material again removed by vacuuming. A third material, etc., may also be deposited and selectively bonded.

Using selective placement or selective bonding of powdered materials with differing physical characteristics reduces the volume of relatively expensive tungsten or tungsten carbide required for the bit body, as such would be used only where necessary and may reduce the size of the blank required or eliminate the need for a conventional blank altogether due to the employment of an inherently tough and ductile matrix material throughout the majority of the bit body volume. Only a short "stub" blank may thus be required for welding the threaded shank to the bit body, or the relatively low or even ambient temperatures employed in the bit fabrication process of the present invention may permit the matrix to be secured (sintered, fused or mechanically secured) to a combination blank/shank during the matrix formation process without adversely affecting the physical characteristics of the blank/shank. It should further be recognized that yet a third type of powder 208, as shown in FIG. 5, may be deposited in a controlled manner to build an effective "blank" within the bit body, if such is desired.

To perform this particular variation of the method, referring again to FIGS. 4A–4D, tungsten carbide or ceramic particles (either resin-coated, binder-coated or mixed with a resin or a binder) may be deposited on the platen 102 in one or more rings or shells approximating the outer periphery and any internal features (e.g., internal fluid passages) of the exposed layer of the bit body. A laser is then used to bond the powder particles, and a subsequent controlled deposition of particles then effected to define the second layer, which is then formed and simultaneously fused to the first layer. To promote more uniform layering, complete planar layers of tungsten carbide or ceramic may be deposited instead of a ring, and (if a second material is to be used for the bit interior) the unbonded material later recovered, placed in the hopper and used for formation of the next bit. If such a practice is followed, it also becomes relatively easy to define all of the internal fluid passages 210 (see FIG. 5) of the bit body by building "stacked" (i.e., the layer-manufactured walls of internal fluid passages) passage wall segments 204 (see FIG. 5). It is further contemplated that if the "shell" embodiment of the method of the present invention is employed, the interior volume of the bit body may comprise a hardenable liquid such as molten iron, steel, or a non-metallic substance such as a polymer, and the second powder and infiltration thereof may be eliminated altogether.

Another variation of the method which may employ at least two different powders in the matrix differs from the variations described above in that only an outer bit shell (an illustrative layer thereof being a hard outer periphery 202 in FIG. 5) is formed by the layering process, and the shell may later be fitted with preforms for defining the internal fluid passages 210, filled with the second powder and the assembly subsequently infiltrated with binder. The shell thus forms a mold for casting the vast majority of the bit body, and then becomes an integral part thereof.

In another variation of the manufacture of a particulate-based bit body, layered-manufacturing processes are employed to fabricate a bit body of matrix powder, preferably iron, steel, Invar, ceramic, or another tough and ductile material. A mold or other support structure of ceramic or other suitable materials may be cast or otherwise formed around the particulate-based bit body. As illustrated in FIG. 6B, a support structure 302 may be formed by pouring a hardenable liquid 304, such as ceramic or plaster, into casing 306 around the core 300 and permitted to harden into a solid support structure 302 that is resistant to temperatures substantially above that at which a binder liquifies. The support structure 302 may be placed into a furnace or an induction coil, such as that disclosed in U.S. Pat. No. 5,441,121 to Tibbitts and assigned to the assignee of the present invention, or heated by other means known in the art in order to sinter the particulate matrix material of the core 300. During the sintering process, the resin in the combination steel and laser-reactive bonding agent core 300 may substantially dissipate and/or vaporize. This dissipation may cause the core 300 to shrink in size.

Figure 6A:
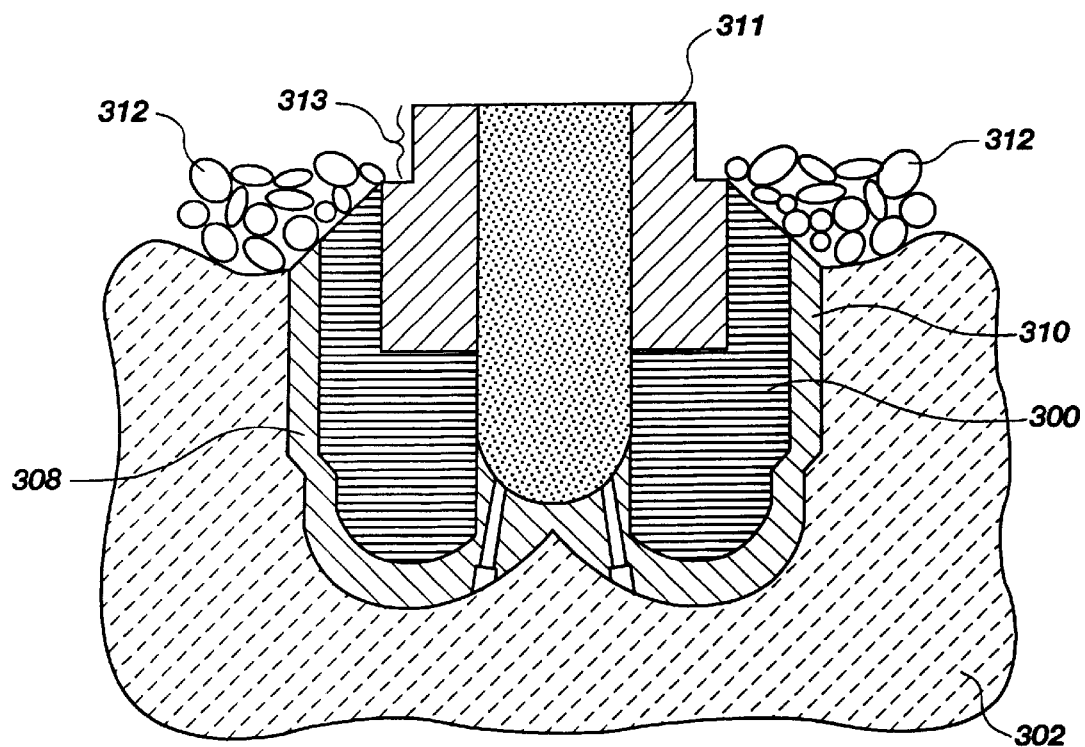
FIG. 6A is a cross-sectional view illustrating yet another variation of the bit body manufacturing process of the inventive method, depicting a bit body disposed within a bit mold.
Figure 6B:
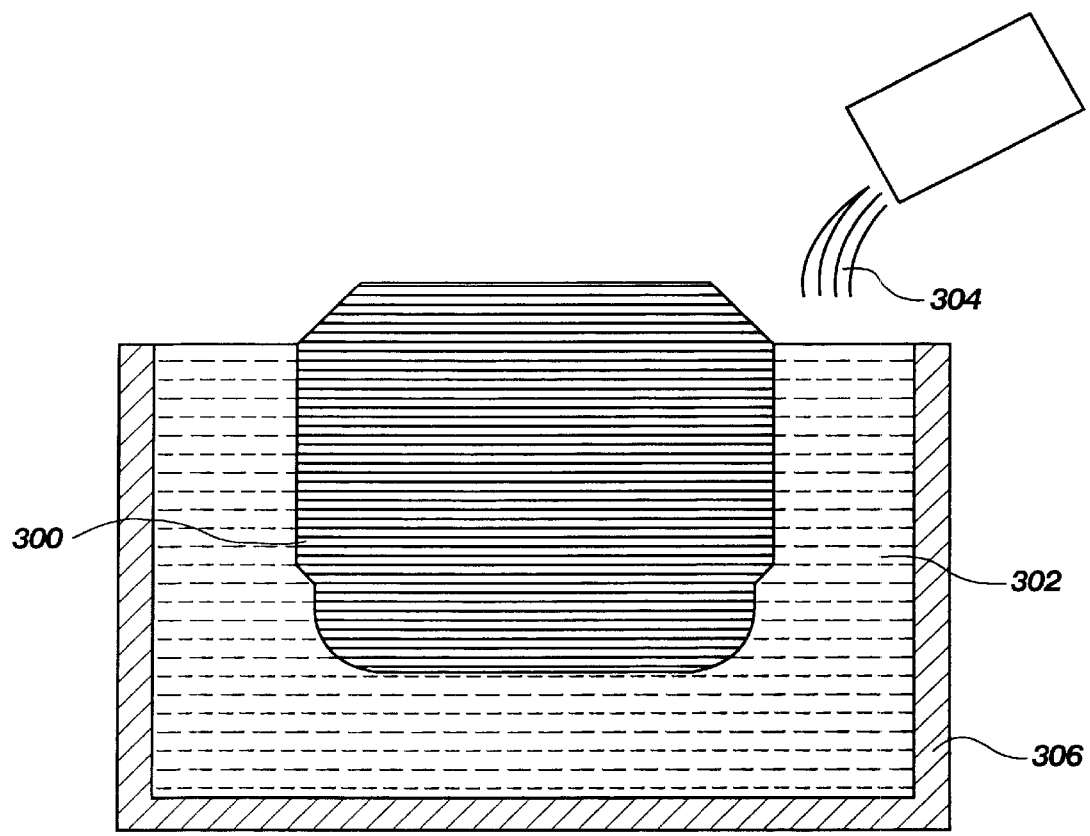
FIG. 6B is a cross-sectional view of the bit mold illustrated in FIG. 6A.

As illustrated in FIG. 6A, with the sintered core 300 in place, the support structure 302 is subsequently packed with matrix powder 308, as by vibration or other methods known in the art, into the space 310 between the shrunken core 300 and the solid support structure 302. A more conventional blank insert 311, comprised of a machinable material such as steel and having a substantially cylindrical portion 313 for machining of threads therein for later attachment to a shank as is known in the art, may be inserted into the core 300. The matrix powder 308 and the core 300 may subsequently be infiltrated with a binder 312, as discussed in greater detail below.

Figure 7:
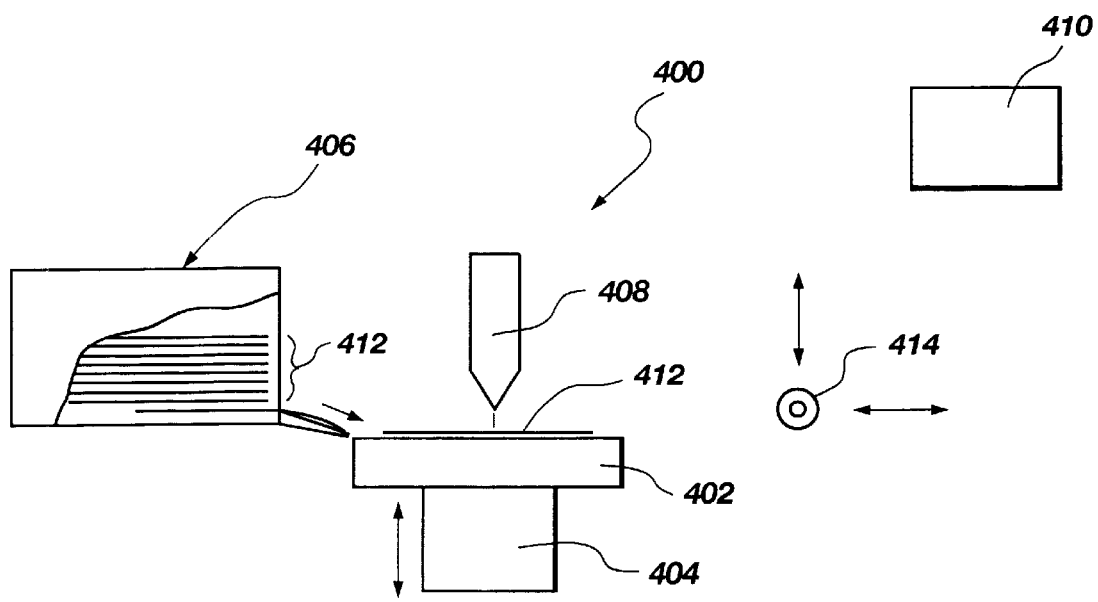
FIG. 7 is a schematic of a second preferred layering apparatus suitable for use in fabrication of a drill bit according to a variation of the layered-manufacturing process of the method of the present invention.

Yet another variation of the layered-manufacturing process employs sheet material, rather than powders or particulates, to form the bit body matrix. As depicted in FIG. 7 of the drawings, an apparatus 400 for effecting the method includes at least a platen 402, means 404 for moving platen 402 in vertical increments, sheet feeder 406, laser head 408 and control computer 410. Sheet feeder 406 may comprise a photocopier-type feeder and provide individual sheets, or may comprise a roll-type feeder with a feed roller and a take-up roller, as desired. In either case, a sheet 412 of matrix material (which is preferably a screen or perforated or porous sheet) of a suitable metal such as iron or steel, or a non-metallic material such as a composite, is placed on platen 402. Laser head 408, under control of computer 410, cuts an outline of the periphery of that layer of the bit body being formed. The surrounding sheet material may then be removed, if desired, and a second uncut sheet 412 placed over the first is bonded to the first by suitable means, after which laser head 408 cuts the perimeter outline of the second layer of the bit body. If desired, the laser may be used to rapidly heat the second layer and bond it to the first before the second sheet 412 is cut at its periphery. The more usual method, however, employs a heated roller 414 which is pressed and rolled over the uppermost sheet 412 before the sheet periphery is cut.

Such bonding can be effected by sintering if the sheet material is metal, or may be adhesive in nature. For example, the top or bottom (or both) of each sheet may be coated with a heat-activated or meltable bonding substance. A further alternative is the use of layers of sheet material comprising a screen-like, perforated or porous sheet of matrix material impregnated with a binder which may be melted or otherwise activated by laser head 408 and/or heated roller 414. Yet another alternative is to alternate sheets 412 of matrix material with sheets of a binder material, or powdered layers of a binder material, or even to spray a binder material on the top of each sheet 412 before the next is placed. Further, and if desired, sheets of matrix material may include a ring of a different material than the main body of the sheet, and the laser employed to cut the layer periphery so that the ring material forms the outer shell of the bit. It is also contemplated that the laser may be used to cut internal fluid passage segments 34' (see FIGS. 2 and 3) in each layer after placement. As with the other, previously-described embodiments of the method of the invention, bit body components may be formed for subsequent assembly with other components to form a bit body.

Machining the Article

Figure 8:
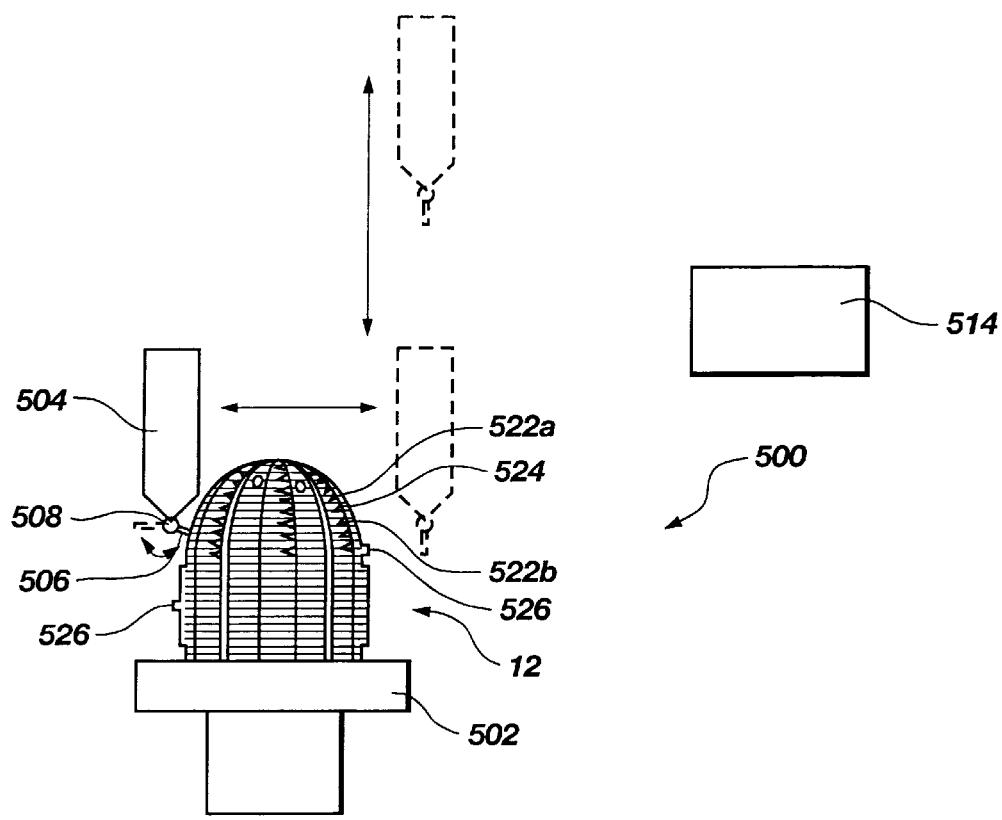
FIG. 8 is a schematic representation of a machine tool suitable for use in fabrication of a drill bit according to a preferred machining process of the method of the present invention.

The bit body 12 at this stage is preferably a porous, sponge-like or open-celled matrix which can be machined to correct any anisotropies or other imperfections that may occur during the layered-manufacturing process. Referring to FIG. 8, the process of machining the bit body 12 is schematically represented. Anisotropies, which include, but are not limited to, distortions in the shape of the bit body 12 itself, or in various features thereof, such as the blades, cutter pockets, fluid courses, junk slots and gage pads, may occur as the matrix particles are selectively fused to one another. Other imperfections that may be formed on bit body 12 include, without limitation, "stepping" 524, which is caused as adjacent layers 522a, 522b with differently shaped perimeters are bonded to one another, and surface imperfections 526 that may be caused by the bonding of ancillary particles at the periphery of selectively bonded regions of a layer, which may result in excess material that protrudes from various features of the bit body.

Because the bit body matrix is fairly weak at this point, it may be easily machined to remove the powder to correct any anisotropies or imperfections that may occur during layered-manufacturing. Bit body 12 may be machined by techniques known in the art, including, without limitation, manually or by automated means 500 (e.g. under control of a computer or processor 514) such as with a multiple-axis machine tool or with an electrical discharge machine (EDM) of types known in the art. Preferably, automated machining includes the use of a control arm 504 that is movable in each of the X, Y and Z planes. The control arm 504 includes a pivot 508, from which a tool 506 extends. The tool 506 may be pivoted around the pivot 508 to adjust the direction that tool 506 extends.

Various types of machining that are within the scope of the invention include, without limitation, surface milling, contour milling, cutting, sawing, drilling, boring, reaming, slitting, countersinking, counterboring, honing, turning, threading (e.g., by tap or die), grinding, parting, lapping, hobbing, broaching, grooving, scraping, planing, burnishing and polishing. When automated machining means are employed to correct anisotropies and imperfections of bit body 12, a numerically defined tool path, which is patterned after desired surfaces, apertures and passages in a "solid" CAD model and stored in a computer, directs the machining process. Additional features of the bit body 12 may also be defined in this manner. Subsequently, the bit body 12 may be infiltrated by any of the variations that were discussed above.

Supporting the Article

Because of the substantial mass and weight of the bit body 12 and the blank (not shown), it may be necessary to provide support for the layer-manufactured bit body 12 of the drill bit 10. In particular, because the particles forming the bit body 12 may be held together by a polymer or epoxy resin, the structural integrity that such a component may have at room temperature may not be maintained during the infiltration process. Specifically, structural collapse may occur in more massive components with cantilevered, thinned or poorly supported portions, such as the distal end 13 of the bit body 12, that would otherwise be employed to help support the weight of the bit body 12 and blank (not shown). Also, as previously noted, assemblies of components, such as shown in FIG. 10, or assemblies of particulate-based preforms, such as bit bodies and bit blades, may require support.

Figure 9:
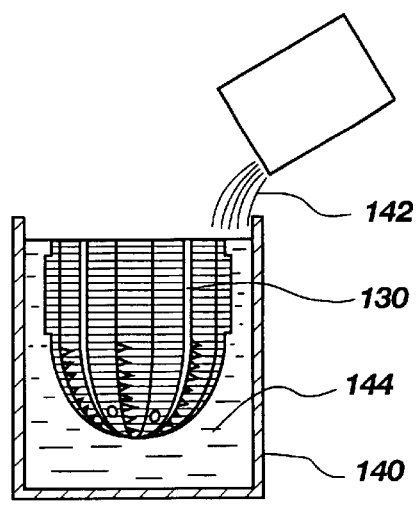
FIG. 9 is a schematic representation of a preferred bit body supporting process of the method of the present invention.

With reference to FIG. 9, prior to infiltration, matrix 130 may be coated with a sealer or other non-wettable substance, such as boron nitride, aluminum nitride, NICOBRAZE GREEN STOP-OFF, manufactured by Wall Colmonoy, Inc. of Madison Heights, Mich., or ZIRCWASH, manufactured by Zyp Coatings, Inc. of Oak Ridge Tenn., to close the exterior pores of the bit crown and those opening onto any interior voids within matrix 130, then inverted and positioned in a mold casing 140 as shown in FIG. 9. A hardenable liquid 142, such as Cotronics 770 (a ceramic), plaster, or other materials known in the art that can withstand the high temperatures encountered during the infiltration process and provide solid structural support upon solidification, is then poured into mold casing 140 and permitted to harden into a solid mold form 144 resistant to temperatures above that at which a binder liquifies, the mold form 144 both surrounding the exterior of matrix 130 and filling internal fluid passages 34 and other internal voids. Similarly, the bit 10 may be dipped one or more times into a castable material, such as a ceramic or plaster slurry to form a relatively rigid material around the bit body 12. Alternatively, a support structure may be formed around the bit body.

Figure 10:
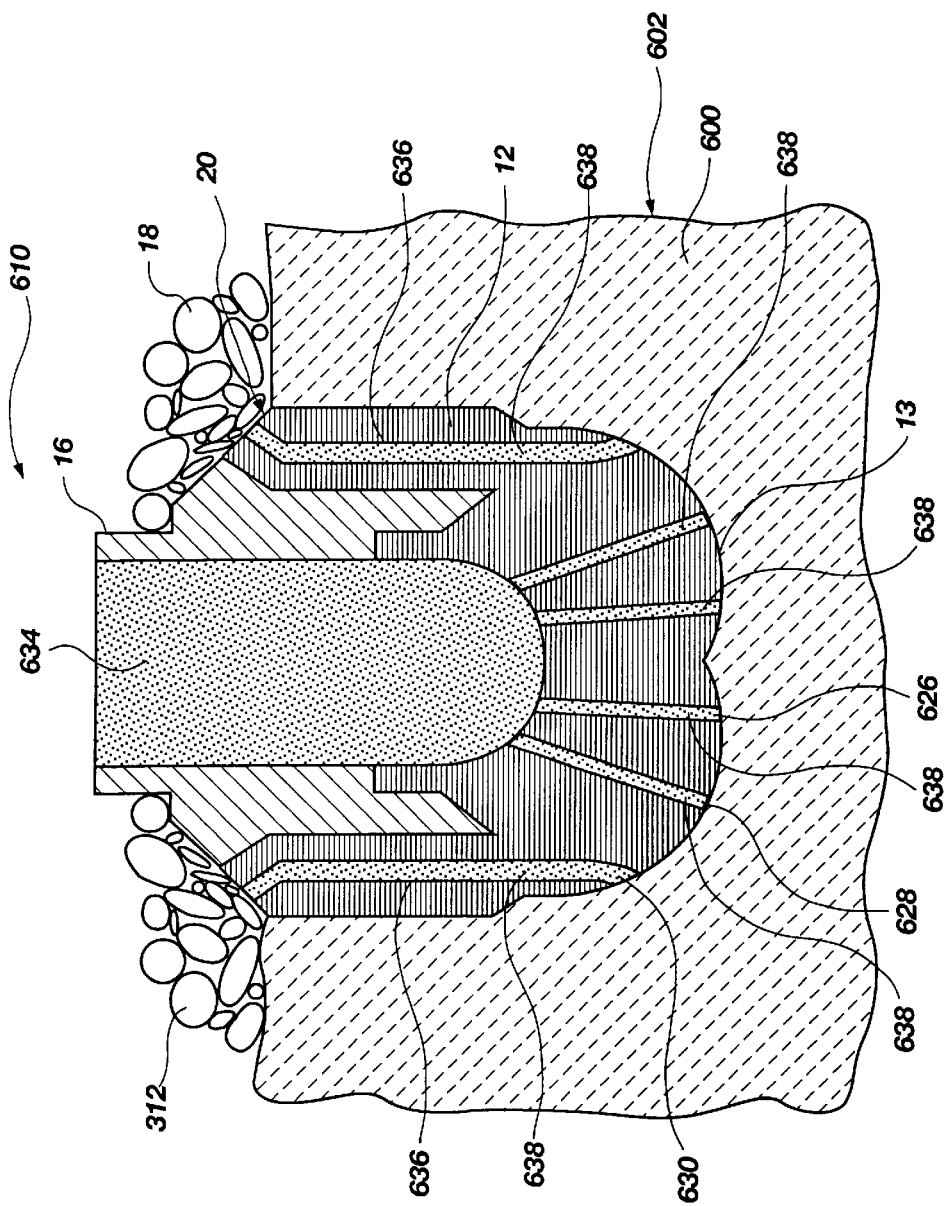
FIG. 10 is a cross-sectional view of a support structure supporting a porous matrix of a drill bit therein.

In any case, as illustrated in FIG. 10, it may be preferable to plug or substantially fill any orifices or openings, such as orifices 626, 628, and 630, leading to internal chamber or plenum 634 or passageways 636 in the component with a filler material 638 so that castable material 600, which may otherwise be difficult to remove from any such orifices or openings, does not accumulate inside the bit 610. Filler material 638 may be comprised of various non-wettable materials such as sand, graphite particles, or other suitable materials known in the art. It should be noted that for castable materials that can be easily removed from plenum 634 or passageways 636, it may not be necessary to provide filler material 638, allowing the castable material 600 to prefill the internal plenum 634 and passageways 636 of the bit 610.

It is also contemplated that filler materials 638 that can be relatively easily removed from orifices 626–630, plenum 634 and passageways 636 of the drill bit 610 may provide sufficient internal support for the drill bit 610 during infiltration, such that external support provided by the castable material 600 may not be required. For example, the plenum 634 and passageways 636 could be filled with a hardenable material, such as a graphite slurry, that can later be dissolved, destroyed or otherwise removed after or while infiltration occurs. Such a configuration would allow a binder 312 to be placed adjacent the bit body 12 and subsequently "wicked" into the bit 10 as the binder 312 melts, and would not necessitate the use of external support of the bit 10 during infiltration. It is appreciated, however, that both internal and external support could be combined to structurally support the bit 610 during infiltration.

Figure 11:
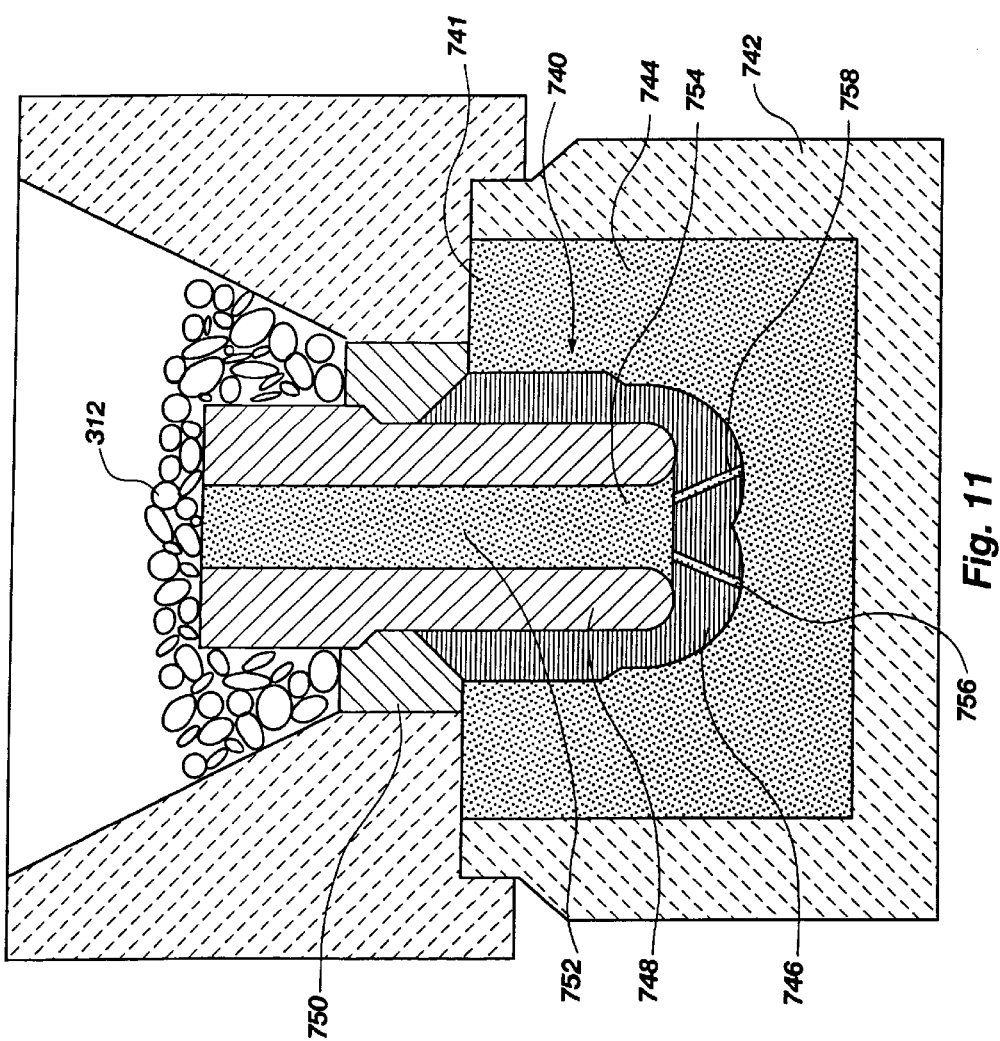
FIG. 11 is a cross-sectional view of a variation of the support structure of FIG. 10.

FIG. 11 illustrates a variation of the support process, showing a drill bit 740 positioned within a refractory vessel 742 and surrounded by granular, non-wettable particulate matter 744. The bit 740 is comprised of a layer-manufactured bit body 746, a premachined steel blank 748 positioned within the bit body 746, and matrix powder 750, such as tungsten, in a ring-like shape surrounding a portion of the blank 748 that can be later machined to provide an interface between the bit body 746 and the blank 748. Preferably, the particulate matter 744 is vibrated prior to infiltration to substantially pack the particulate matter 744 around the bit 740. In addition, the same or other non-wettable, particulate matter 752 can be provided in internal chambers or passageways 754, 756, and 758 of the bit 740.

The bit body 746 may shrink in size as it is heated due to the dissipation or vaporization of the resin that holds the particles of bit body 746 together. Thus, it may be desirable to flow a scavenging, reducing, or oxidizing gas, such as oxygen, hydrogen, or mixtures of oxygen and hydrogen with other gases, or a solvent, such as an alcohol, ester, hydrocarbon, petroleum, chlorinated solvent, ketone, or an other organic or inorganic material through the bit body 746 to dissolve and substantially remove the resin from the bit body 746.

Accordingly, a "soft" or unconsolidated mold 741 that is formed from a granular, non-wettable, particulate matter 744 may maintain conformance to the shrinking bit body 746 and, therefore, continue to structurally support the bit body 746. Particulate matter 744 may be comprised of casting sand, graphite, ceramic powder, silica, alumina, silicon carbide or combinations thereof, or other suitable materials known in the art that will not harden or otherwise become rigid during the infiltration process. In addition, the ability of the support particulate matter 744 to be relatively compliant relative to the bit body 746 may keep the binder 312 from pooling or accumulating in gaps that may otherwise form between a substantially rigid, dimensionally stable mold and a shrinking bit body.

It is also contemplated that a relatively loose material that solidifies or otherwise strengthens during the infiltration process by sintering, tacking, and/or chemically bonding may provide sufficient support for the bit 740. That is, a particulate matter 744 could be selected that would retain its unconsolidated nature as the resin, or other material initially binding the bit body 746 together, is being removed and as the part is changing shape. At higher temperatures, however, after the resin has been removed and the part is relatively dimensionally stable, the particulate matter 744 could solidify or otherwise strengthen to provide a more rigid support. Thus, in effect, the mold 741 conforms to the bit 740 during the beginning stages of furnacing and then becomes more firm during infiltration.

Other alternatives include a mold 741 that is initially substantially rigid, that weakens over time when the mold 741 is exposed to a high temperature, such as the infiltration temperature, and that is subsequently easily removed from the infiltrated component or assembly. For example, sand bonded together with a polymer may provide rigid support until the polymer is heated to the temperature at which the polymer melts, vaporizes, decomposes, or otherwise dissipates, leaving the sand in a relatively loose form.

Figure 12B:
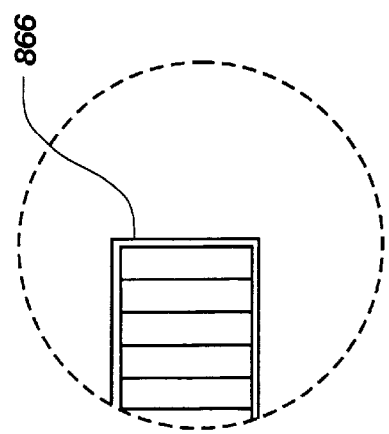
FIGS. 12A and 12B are cross-sectional views of a third embodiment of a support structure supporting a layer-manufactured impeller for a centrifugal pump therein.
Figure 12A:
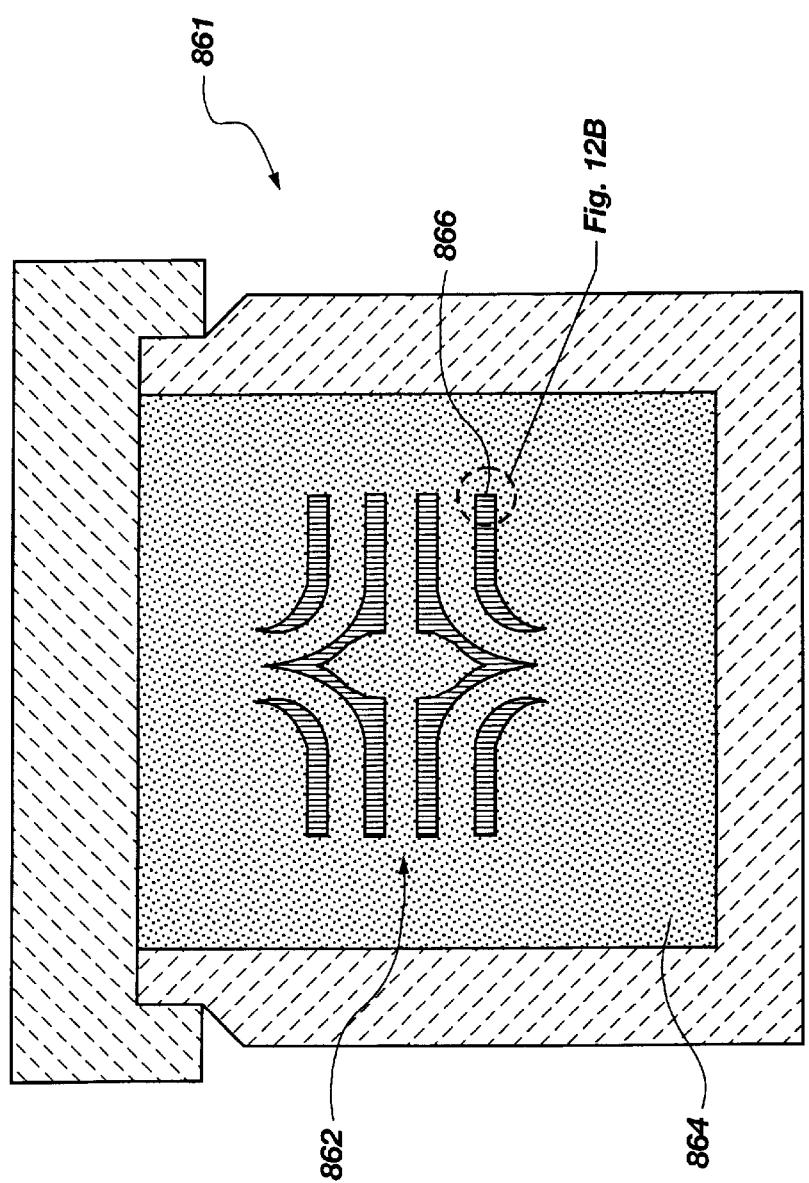

FIGS. 12A and 12B depict another variation of the support process, illustrating another configuration for a mold 861 where a binder has been infiltrated into the layer-manufactured component, such as an impeller 862. FIGS. 12A and 12B also illustrate the applicability of the present invention to nondrilling-related structures, such as an impeller 862 for use in a centrifugal pump. During the layered-manufacturing process, it may be possible to layer both the metallic particles and the binder material substantially simultaneously or layer-by-layer to form the impeller 862. Accordingly, it may not be necessary to provide an exposed surface through which additional infiltrant may be imbibed as illustrated in other preferred embodiments herein described. If, however, additional infiltrant is desired, a mold configuration similar to that illustrated in FIG. 10 may be utilized to expose a surface of the impeller 862 and allow the additional binder to be placed adjacent the surface and imbibed therethrough.

The particulate matter 864 of the mold 861, while preferably non-wettable, may be a wettable substance, such as steel and/or stainless steel to improve the thermoconductivity of the mold 861. Accordingly, it may be desirable to coat various surfaces of the component being infiltrated by spraying, painting, dipping or otherwise coating with a sealer or other non-wettable substance, such as boron nitride, aluminum nitride, NICOBRAZE GREEN STOP-OFF and other materials such as ZIRCWASH, so that the particulate matter 864 will not infiltrate and bond to the matrix powder which comprises the impeller 862 during the infiltration process. A resistive coating 866 (as better shown in FIG. 12B) may serve to keep the binder within the confines of the impeller 862 so that the particulate matter 864 is not infiltrated and bonded to the impeller 862. Moreover, it is contemplated that such a resistive coating 866 may improve the surface finish of the finished component by filling exterior and/or interior pores of the layered component and providing a more consistent surface against which the binder may solidify. Thus, the resistive coating 866 may be useful in other embodiments of the inventive method regardless of the type of material from which the mold or support structure is made.

Infiltrating the Article

Referring again to FIG. 9, prior to infiltration of the bit body powdered matrix with a binder material, the mold may be preheated to dissipate or vaporize any resin in the matrix. A hardenable liquid binder is then mass infiltrated into matrix 130, in the manner well known in the art, to fill the pores or cells therein and permitted to harden, the finished product comprising bit body 12 (see FIG. 1). The mold form is then removed from bit body 12, and the mold material filling internal fluid passages 34 (see FIGS. 1 and 2) and other voids is removed. For infiltration to occur, the bit body 12 (see FIGS. 1 and 2) and blank (not shown) are loaded into a furnace or other heating device, such as an induction coil, as known in the art, and heated to about 950° to 1200° C. or hotter, at which temperature the hardenable liquid binder 142 has liquified and will imbibe into the various parts of the bit body 12. During infiltration, the hardenable liquid binder 142 melts and moves past the blank (not shown) and through the bit body 12 by gravity, capillary action, or the application of pressure to the hardenable liquid binder 142. The hardenable liquid binder 142 effectively binds the particles comprising the bit body 12 together, as well as the bit body 12 to the blank (not shown), resulting in a single structure. In addition, the hardenable liquid binder 142 fills voids or vugs present between the particles of the bit body 12.

A polymeric binder, such as a polyester or epoxy resin, or even glass, may be employed to infiltrate matrix 130. In some instances, the infiltration may thus be carried out substantially at room temperature by pouring the liquified binder into the mold casing 140. Alternatively, a more traditional metal binder, such as a copper-based alloy, or a high melting-point, nonmetallic binder such as glass, may be placed on top of matrix 130 and the mold casing 140 with matrix 130 and binder placed into a furnace until the binder melts and infiltrates downwardly into matrix 130. A particularly suitable copper alloy is disclosed in U.S. Pat. No. 5,000,273 to Horton et al., the disclosure of which is hereby incorporated by reference in its entirety. If desired, with any type of binder, pressure may be applied to the mold casing 140 to eliminate air pockets and attendant potential structural defects in the end product bit body 12.

Figure 13:
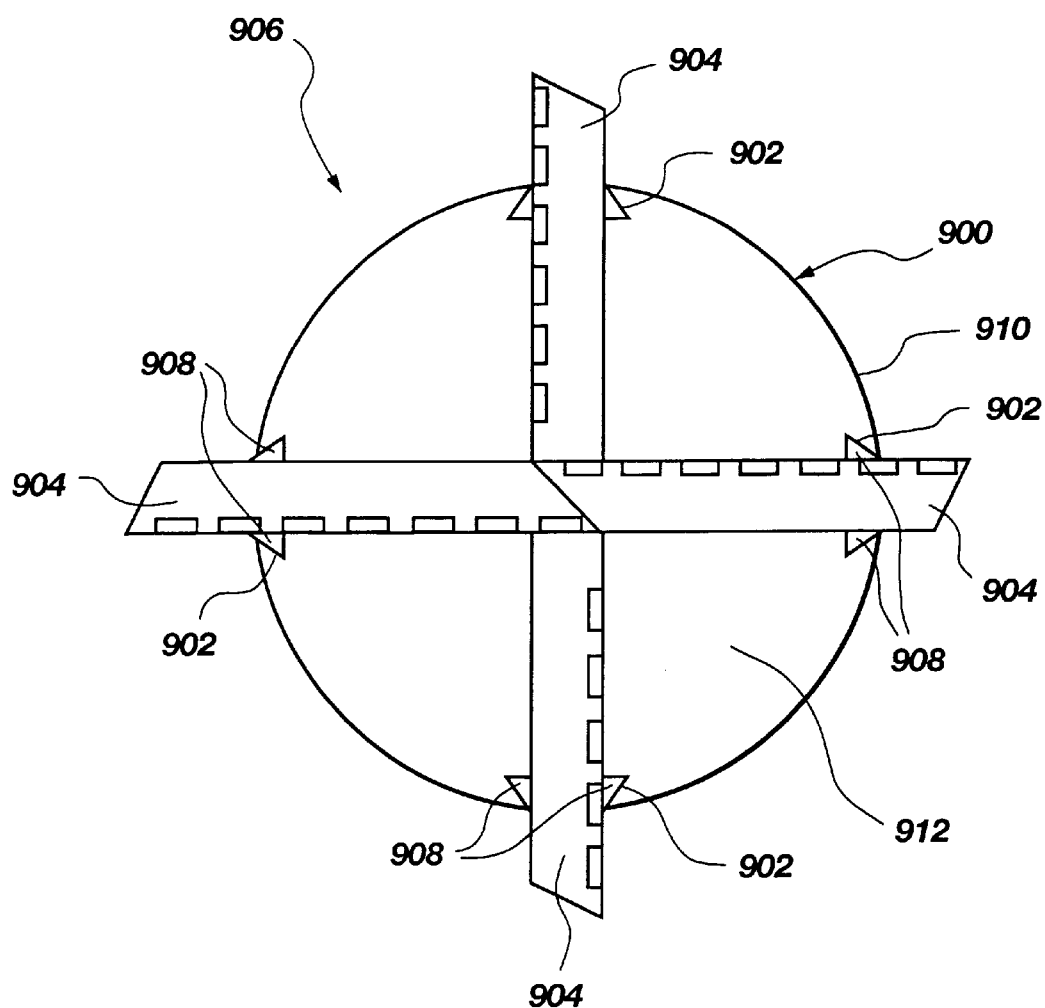
FIG. 13 is a schematic bottom elevation of a wing- or blade-type drill bit formed of interlocked components fabricated by the method of the present invention.

As depicted in FIG. 13 of the drawings, a wing- or blade-type drill bit or other complex bit body configuration may be fabricated by forming a central component 900 by the method of the present invention with grooves, channels or cavities 902 therein adjacent the gage 910. Wings or blades 904 may also be formed by the method of the present invention to extend over the face 912 of the bit. The assembly 906, maintained together by the interlocking of the key portions 908 of blades 904 with grooves 902, is then infiltrated, as previously described, to form a complete unit. Central component 900 may also be formed without grooves 902, and wings or blades 904 without key portions 908, and the components merely placed in abutment in a mold or other support structure for infiltration. Components may be adhered together for infiltration, or held together mechanically by fasteners, if desired. In lieu of forming a central component and separate blades, components configured as halves, quarters or other equal or unequal fractions or portions of bit bodies may be separately formed for subsequent assembly and unification. In short, bit body components may be defined at will using the CAD system in any manner desired and subsequently formed by the method of the invention.

It is also contemplated that other components of a bit body not formed by the method of the present invention may be assembled with components formed by the inventive method and secured thereto during the infiltration process. For example, components machined or cast from metal or other materials may be secured to porous or particulate based components by infiltration. In addition, thermally stable diamond cutting elements, such as natural diamond or thermally stable polycrystalline diamond compacts (PDCs), which are also referred to as thermally stable products (TSPs), may be adhered to the layered bit body prior to infiltration and secured thereto during the infiltration process. If a suitable low-temperature binder is employed to infiltrate the bit body, non-thermally stable PDCs may be secured during infiltration. Other cutting elements known in the art, such as hot isostatic pressed diamond-impregnated cutting elements, cubic boron nitride cutting elements, or diamond film cutting elements, may also be assembled with a bit body or bit body components formed by the method of the present invention, infiltrated therewith and bonded thereto by a suitable binder. Of course, any and all types of cutting elements may be secured to a bit body after formation and infiltration, as known in the art. As used herein, the term "bit body components" specifically contemplates, without limitation, cutting elements and cutting structures.

Referring now to FIG. 14, in a second embodiment of the manufacturing method of the present invention, layered-manufacturing processes, such as those described above, may be employed to form a "green" particulate-based bit body 12', which is also referred to as a bit body matrix, from relatively thick layers 1122. Due to their thickness, the layers 1122 of the "green" bit body 12' may lack fine details, or even various features of the bit body 12 of FIGS. 1 and 2.

With reference again to FIG. 2, a solid, three-dimensional bit body model may be numerically "sliced" along any desired plane. Surface 42 may include an outer periphery which, when superimposed with various other layers of the bit body model, defines various features on the outer surface of the bit body 12, as well as apertures or voids therethrough, which define segments 34' of internal fluid passages 34. Alternatively, following the layered-manufacturing process, such features may be defined by machining the "green" bit body 12, as schematically illustrated in FIG. 8.

The layers may be formed by any of the variations of the first embodiment of the inventive method, as described above. With reference again to FIG. 14, each layer 1122 of powdered material may, however, be spread relatively thickly compared to the thickness of layers that are spread in accordance with the preceding embodiment of the method (e.g., greater than 0.020 inches). Each layer 1122 may then be bonded together and to a previously formed adjacent layer 1122', as described above.

Due to the increased thickness of the layers 1122, "stepping" on the surfaces of the bit body 12' and its various features are readily apparent. Similarly, the thickness of the layers 1122 may exaggerate anisotropies and other imperfections that may occur relative to the anisotropies and other imperfections that may occur when thinner layers are formed, such as by the layered-manufacturing process of the previous embodiment of the manufacturing method. Accordingly, following the fabrication of the "green" bit body 12', anisotropies and other imperfections may be removed, details of the bit body 12' refined, and various features defined by machining processes that were described above.

Machining of the "green" bit body 12' may include manual or automated machining techniques, as described above. Preferably, an automated machining technique, such as the use of a numerically controlled, multiple axis machine tool, is employed in order to facilitate the proper positioning, alignment, and sizing of various features and details of the bit body 12'.

Similarly, with reference again to FIG. 5, a "green" tungsten carbide hard outer periphery 202 may be formed by layer-manufacturing techniques, as described above, then subsequently machined, as described above, to define various features on the bit body shell or otherwise add detail thereto. In order to form a solid bit body, a second powdered material 206 may be disposed within the hard outer periphery 202 either before or after the hard outer periphery 202 is machined.

Other processes of forming the "green" bit body 12', such as sintering and the processes disclosed above in regards to the previous embodiment, are also within the scope of the manufacturing method of the present invention. Following the fabrication and machining of the "green" bit body 12', the bit body 12' may then be supported, assembled, and infiltrated as described above to form a completed bit.

FIGS. 15 and 16 illustrate yet another embodiment of the manufacturing method, which includes forming a particulate-based block 1200. With reference to FIG. 15, a powered or particulate matrix material 1204, such as tungsten carbide, steel, Invar, ceramics, or other tough and ductile materials, may be disposed in a block mold 1202 with resin 1206. Powdered material 1204 may be coated with the resin 1206, or the resin 1206 may be dispersed throughout the powdered material 1204. The block mold 1202 is then placed into a furnace, induction coil, or other known heating apparatus and heated to a sufficient temperature to melt or soften the resin 1206 and bond the particles of powder and the powdered material 1204 and resin 1206 heated material 1204 together. Alternatively, powdered material 1204 may be infiltrated with resin 1206, as known in the art. As another alternative, powdered material 1204 may be sintered by known techniques. The resulting block 1200 is then removed from the block mold 1202. As yet another alternative, a particulate-based block 1200 may be fabricated by layered-manufacturing processes, as discussed above. Preferably, the resultant particulate-based block is fairly porous, and, therefore, may be easily machined.

FIG. 16 depicts a cross section of the block 1200, taken along a plane perpendicular to the longitudinal axis 1240 thereof (FIG. 15), which preferably has the general appearance of a corresponding cross section of the bit body 12 (see FIG. 1), bit body component, or other article of manufacture to be formed therefrom. Alternatively, the block 1200 may have a generally featureless shape, such as a cylindrical or rectangular shape.

The block 1200 may be machined either manually or by automated means, as discussed above in reference to FIG. 8, in order to define various bit details and features of the bit body 12. Subsequently, the particulate-based bit body 12 may be assembled, supported, and infiltrated as described above to form a completed bit.

Figure 17:
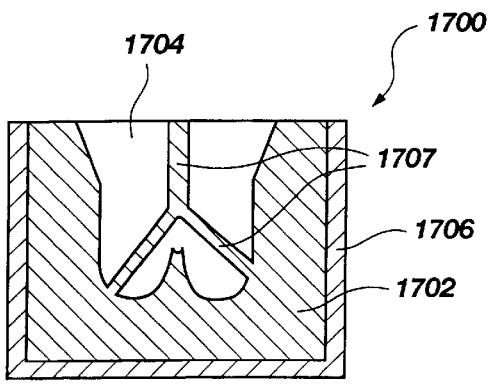
FIG. 17 is a cross-sectional schematic representation of a mold that may be fabricated in accordance with the processes of the present invention.

In another aspect of the present invention, the methods of the present invention may be employed to fabricate a mold, such as a mold with which an earth-boring drill bit may be fabricated. With reference to FIG. 17, a mold 1700 that has been fabricated in accordance with the methods of the present invention includes a mold body 1702 with a cavity 1704 defined therein. Cavity 1704 may include one or more protrusions 1707 that will define fluid paths, or fluid ports, in a drill bit formed in mold 1700. Mold body 1702 is preferably supported from beneath by a boat 1706, such as a graphite or silicon carbide container or support structure that will withstand the temperatures to which mold 1700 will be subjected.

Mold body 1702 comprises a particulate-based matrix of a suitable mold material. Preferably, the mold material is particulate or powdered, non-wettable by any materials to be used therewith, inexpensive relative to the graphite molds that are conventionally employed in manufacturing earth-boring drill bits, and will repeatedly withstand exposure to temperatures of up to about 1000° C. or more (e.g., during infiltration or sintering of a particulate-based matrix). Suitable mold materials include, without limitation, silica sand, silicon carbide, zircon sand, zirconium, and alumina.

Figure 17B:
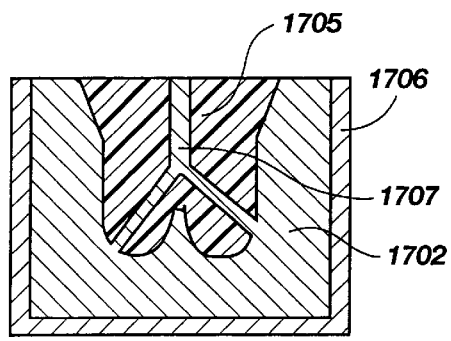
FIGS. 17A and 17B are schematic representations that illustrate methods of fabricating a particulate-based mold.
Figure 17A:
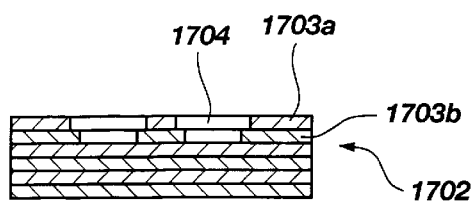

With reference to FIG. 17A, an exemplary process of fabricating mold body 1702 includes layered manufacturing, such as by the processes disclosed in reference to FIGS. 4–4E. When layered manufacturing processes are employed, each layer of particulate or powdered mold material may be held together by a binder, such as a polymeric resin. The manner in which the binder secures adjacent particles of mold material together depends upon the particular variation of the layered manufacturing process employed. The binder may comprise a powder dispersed throughout the mold material or may be coated onto particles of the mold material, wherein a laser or other energy beam that is directed onto select regions of the mold material-binder layer 1703*a* heats the binder to fuse adjacent particles of mold material to each other, and preferably to any adjacent, underlying layer 1703*b* of mold 1700. Alternatively, a liquified binder may be applied to select regions of a layer 1703*a* of mold material to secure particles of mold material in the select regions to each other and to any adjacent, underlying layer 1703*b*. When layered manufacturing processes are employed, mold cavity 1704 and any protrusions 1707 (see FIG. 17) of mold cavity 1704 are preferably defined as contiguous 1703*a*, 1703*b*, etc. layers of mold body 1702 superimposed over one another.

FIG. 17B schematically illustrates another method of fabricating mold body 1702, which includes compactly disposing the mold material within boat 1706, which supports the mold material from beneath and around at least the periphery thereof. One or more displacements 1705 may also be disposed within the mold material so as to define mold cavity 1704 and any protrusions 1707 thereof. The particles of mold material are then secured to one another. The particles may be secured to each other by dispersing a powdered binder throughout the particles of mold material, then heating the boat 1706 and the mold material and binder therein to a temperature sufficient to liquify the binder and thereby secure the particles of mold material to one another as the binder cools. Alternatively, the mold material that is disposed within boat 1706 may be infiltrated with a molten binder, such as a polymeric resin, in order to secure adjacent particles of the mold material to each other. As another alternative, the particles of mold material may be secured to one another by sintering, as known in the art.

Figure 17C:
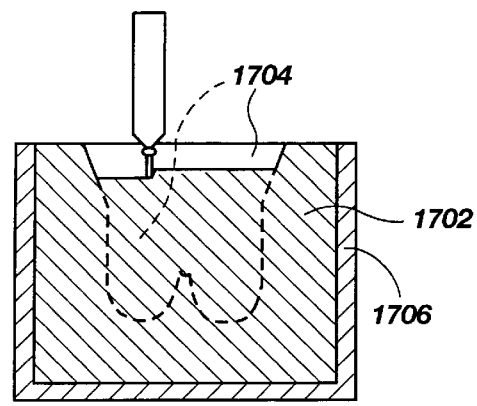
FIG. 17C is a schematic representation of a method of machining the particulate-based mold.

As the particles of mold material are held together by relatively low-strength bonds, the mold body 1702 may be easily machined, as depicted in FIG. 17C. The machining processes of the present invention, as disclosed in reference to FIG. 8 (e.g., the use of a multi-axis machine tool, manual machining techniques, etc.), may be employed to correct any anisotropies or other imperfections of mold cavity 1704 that may occur during the fabrication of mold body 1702 and mold cavity 1704. Thus, it may be necessary to redefine various features in mold cavity 1704, such as the regions which correspond to the blades, cutter pockets, junk slots, gage pads, and other features of an earth-boring drill bit as the particles of mold material are selectively fused to one another. When layered manufacturing processes are employed to fabricate mold body 1702 and define mold cavity 1704, mold cavity 1704 may be machined to remove any stepping or ancillary particles therefrom. Alternatively, the machining processes of the present invention may be employed to define various fine features in mold cavity 1704, to define larger features in mold cavity 1704 that were not defined during the fabrication of mold body 1702, or to completely define mold cavity 1704 and any protrusions 1707 of mold cavity 1704 in a mass of mold material particles that have been secured to one another.

Figure 17D:
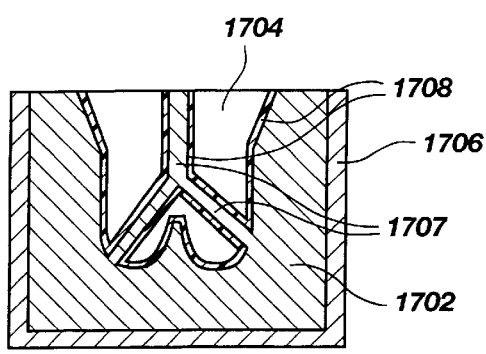
FIG. 17D is a cross-sectional schematic representation of a particulate-based mold including a layer of coating material disposed over the surfaces of the cavity thereof.

With reference to FIG. 17D, a layer 1708 of coating material may be disposed over the surfaces of mold cavity 1704 and protrusions 1707 to isolate any polymeric binder of mold body 1702 from exposure to mold cavity 1704 or protrusions 1707. Thus, layer 1708 is preferably substantially confluent and covers at least the surfaces of mold cavity 1704 and any protrusions 1707 that will be exposed to a molded material as an article of manufacture is formed in mold 1700. The cavity coating material is preferably non-wettable and withstands exposure to temperatures of up to about 1000° C. or more. Coating materials that may be disposed on the surfaces of mold cavity 1704 or protrusions 1707 to form layer 1708 include, but are not limited to, boron nitride water-glass, ZIRCWASH, NICOBRAZE GREEN STOP-OFF, aluminum oxide, silicon carbide, and silicon oxide. When disposed in a layer 1708 over the surface of cavity 1704 or protrusions 1707, such coating materials may prevent the migration of any molten materials into mold body 1702 or the migration of binder into a molded part during molding.

In an example of the use of mold 1700, mold cavity 1704 may be filled with a particulate material, such as tungsten carbide, from which an article of manufacture is to be formed. Known processes, such as the use of conventional or induction furnaces, are then employed to imbibe the tungsten carbide, which comprises a somewhat porous, permeable matrix, with a liquified infiltrant of a type known in the art. Alternatively, mold cavity 1702 may be filled with a liquid material, such as molten steel, from which a part will be formed.

Alternatively, a rubber master may be formed in mold 1700, then employed to form another, secondary mold of a castable or pourable material, such as ceramic, as known in the art. The rubber master is then removed from the secondary mold. Features, such as fluid paths, or fluid ports, or other features of the part to be molded, may subsequently be redefined or defined in the rubber master or the secondary mold by the machining process of the present invention, as previously disclosed in reference to FIG. 8. The secondary mold may then be employed to fabricate an article of manufacture.

While the present invention has been disclosed in terms of certain illustrated and described embodiments, those of ordinary skill in the art will readily recognize and appreciate that it is not so limited, and that many additions to, deletions from and modifications of the invention as disclosed may be employed without departing from the scope of the invention as hereinafter claimed. For example, the porous bit body matrix may be fabricated by other known processes, such as sintering. As another example, interconnectable or mating components may also be manufactured in accordance with the method of the present invention and are within the scope of the present invention. Each interconnectable component is machined from a particulate-based block, complementary portions of each component are mated, and the components integrally infiltrated by known processes. A porous bit body matrix may also be machined in accordance with the inventive process to receive a blank or other interval insert.

What is claimed is:

1. A method of manufacturing a drilling-related structure for drilling a subterranean formation, comprising:

fabricating a porous, bonded particulate matrix comprising at least a portion of the drilling-related structure from particulate material; and removing bonded particulate material from said matrix.

2. The method of claim 1, wherein said fabricating said matrix comprises forming a permeable matrix.

3. The method of claim 1, wherein said fabricating said matrix comprises forming a plurality of superimposed contiguous layers of said matrix material.

4. The method of claim 1, wherein said removing comprises machining said matrix.

5. The method of claim 4, wherein said machining comprises manually machining said matrix.

6. The method of claim 4, wherein said machining comprises automatedly machining said matrix.

7. The method of claim 1, wherein said removing comprises following a pattern of at least a portion of a three-dimensional solid model of the drilling-related structure.

8. The method of claim 1, wherein said removing comprises correcting anisotropies of said matrix.

9. The method of claim 1, wherein said removing comprises removing at least one imperfection from said matrix.

10. The method of claim 1, wherein said fabricating said matrix material comprises forming a particulate material.

11. The method of claim 10, wherein said fabricating comprises depositing said particulate material and securing at least selected particles of said particulate material to each other to define said matrix.

12. The method of claim 11, wherein said securing comprises dispersing a hardenable resin throughout said particulate material, liquefying said hardenable resin, and permitting said hardenable resin to bind said at least selected particles of said particulate material together.

13. The method of claim 11, wherein said securing comprises applying a liquefied hardenable resin to said particulate material.

14. The method of claim 11, wherein said securing comprises sintering said at least selected particles of said particulate material to one another.

15. The method of claim 1, wherein said fabricating comprises:

depositing a first substantially planar layer of said matrix material;

defining a periphery in said first substantially planar layer at a first level corresponding to a periphery of a three-dimensional solid model at said first level;

depositing a second substantially planar layer of said matrix material on said first layer; and securing said second layer to said first layer and defining a periphery of said second layer at a second level corresponding to a periphery of said three dimensional solid model at said second level.

16. The method of claim 15, wherein said depositing at least some of said layers of matrix material further comprise depositing unconsolidated particulate material, and the steps of securing said layers includes consolidating said particulate material.

17. A method of manufacturing a drilling-related structure, comprising:

forming a porous, bonded particulate block of material; and machining said porous, bonded particulate block to define at least one feature thereon.

18. The method of claim 17, wherein said machining comprises manually machining said particulate-based block.

19. The method of claim 17, wherein said machining comprises automatedly machining said particulate-based block.

20. The method of claim 17, wherein said machining comprises correcting anisotropies of said particulate-based block.

21. The method of claim 17, wherein said machining comprises removing at least one imperfection from said porous, bonded particulate block.

22. The method of claim 17, wherein said machining comprises following a pattern of a three-dimensional solid model of the drilling-related structure.

23. A method of manufacturing a drilling-related structure, comprising:

fabricating a porous matrix from a powdered material, said porous matrix having the approximate shape and dimensions of the drilling-related structure; and machining said porous matrix to refine at least one feature thereof.

24. The method of claim 23, wherein said fabricating said matrix comprises forming a permeable matrix.

25. The method of claim 23, wherein said machining comprises manually machining said porous matrix.

26. The method of claim 23, wherein said machining comprises automatedly machining said porous matrix.

27. The method of claim 23, wherein said machining comprises following a pattern of a three-dimensional solid model of the drilling-related structure.

28. The method of claim 23, further comprising binding selected particles of said powdered material together with a binder material.

29. A method of fabricating an article of manufacture, comprising:

forming a porous, bonded particulate block of material; and machining said porous, bonded particulate block to define at least one feature thereon.

30. The method of claim 29, wherein said machining comprises manually machining said porous, bonded particulate block.

31. The method of claim 29, wherein said machining comprises automatedly machining said porous, bonded particulate block.

32. The method of claim 29, wherein said machining comprises correcting anisotropies of said porous, bonded particulate block.

33. The method of claim 29, wherein said machining comprises removing at least one imperfection from said porous, bonded particulate block.

34. The method of claim 29, wherein said machining comprises following a pattern of a three-dimensional solid model of the drilling-related structure.

* * * * *

UNITED STATES PATENT AND TRADEMARK OFFICE
CERTIFICATE OF CORRECTION

PATENT NO.    : 6,209,420 B1
DATED         : April 3, 2001
INVENTOR(S)   : Trent N. Butcher, Sidney L. Findley and Redd H. Smith It is certified that error appears in the above-identified patent and that said Letters Patent is hereby corrected as shown below:

Column 12,
Line 9, change "108b'0" to -- 108b' --
Line 29, before "113" delete "mirrors"

Column 17,
Line 57, before "142" insert -- binder --

Column 26,
Lines 8, 10 and 13, delete "particulate-based"
Line 29, before "matrix" (first occurrence) insert -- porous --
Line 60, change "drilling-related structure" to -- article of manufacture --

Signed and Sealed this

Second Day of September, 2003

JAMES E. ROGAN
*Director of the United States Patent and Trademark Office*